US012445989B2

(12) United States Patent
Liu et al.

(10) Patent No.: US 12,445,989 B2
(45) Date of Patent: Oct. 14, 2025

(54) TIMING SYNCHRONIZATION METHOD AND APPARATUS

(71) Applicant: Huawei Technologies Co., Ltd., Shenzhen (CN)

(72) Inventors: Fengwei Liu, Chengdu (CN); Shitong Yuan, Chengdu (CN); Jing Qiu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 668 days.

(21) Appl. No.: 17/672,516

(22) Filed: Feb. 15, 2022

(65) Prior Publication Data

US 2022/0174636 A1    Jun. 2, 2022

Related U.S. Application Data

(63) Continuation of application No. PCT/CN2020/084061, filed on Apr. 9, 2020.

(30) Foreign Application Priority Data

| Aug. 16, 2019 | (WO) | ................ | PCT/CN2019/101213 |
| Aug. 26, 2019 | (WO) | ................ | PCT/CN2019/102605 |
| Sep. 30, 2019 | (WO) | ................ | PCT/CN2019/109634 |

(51) Int. Cl.
*H04W 56/00* (2009.01)

(52) U.S. Cl.
CPC ............................. *H04W 56/0045* (2013.01)

(58) Field of Classification Search
None
See application file for complete search history.

(56) References Cited

U.S. PATENT DOCUMENTS

| 10,952,239 B2* | 3/2021 | Park ...................... H04W 16/14 |
| 2015/0085839 A1* | 3/2015 | Bergstrom ........ H04W 56/0045 |
| | | 370/336 |

(Continued)

FOREIGN PATENT DOCUMENTS

| AU | 2013303256 A1 * | 3/2015 | ............. G01S 5/021 |
| CN | 102088763 A | 6/2011 | |

(Continued)

OTHER PUBLICATIONS

Ying et al. (U.S. Appl. No. 62/750,563, filed Oct. 25, 2018), (Year: 2018).*

(Continued)

*Primary Examiner* — Wutchung Chu
*Assistant Examiner* — Berhanu D Belete
(74) *Attorney, Agent, or Firm* — Slater Matsil, LLP

(57) ABSTRACT

This application provides a timing synchronization method and an apparatus, to improve precision of a downlink transmit timing of a relay node. The method includes: The first node receives first indication information from a donor node, where the first indication information is used to indicate information about a plurality of second nodes, and the second node is a parent node of the first node. The first node receives a plurality of pieces of timing information (Continued)

from the plurality of second nodes. The first node determines a first downlink transmit timing of the first node based on the plurality of pieces of timing information.

20 Claims, 5 Drawing Sheets

(56) References Cited

U.S. PATENT DOCUMENTS

| | | | |
|---|---|---|---|
| 2018/0317258 A1* | 11/2018 | Wu | H04W 74/0808 |
| 2018/0376339 A1* | 12/2018 | Hu | H04W 16/14 |
| 2019/0014594 A1* | 1/2019 | Park | H04W 16/14 |
| 2019/0053228 A1 | 2/2019 | Akkarakaran et al. | |
| 2019/0110268 A1* | 4/2019 | Abedini | H04W 56/002 |
| 2019/0150141 A1* | 5/2019 | Irukulapati | H04L 5/14 370/280 |
| 2019/0215870 A1* | 7/2019 | Babaei | H04L 5/0098 |
| 2020/0137796 A1* | 4/2020 | Jung | H04W 16/14 |
| 2020/0145967 A1* | 5/2020 | Park | H04W 72/23 |
| 2020/0322976 A1* | 10/2020 | Islam | H04W 56/0045 |
| 2021/0084606 A1* | 3/2021 | Abedini | H04W 80/02 |
| 2021/0105782 A1* | 4/2021 | Marcone | H04L 47/824 |
| 2021/0298000 A1* | 9/2021 | Park | H04W 72/23 |
| 2021/0345279 A1* | 11/2021 | Ying | H04B 7/15528 |
| 2022/0116898 A1* | 4/2022 | Ying | H04W 24/10 |
| 2022/0132453 A1* | 4/2022 | Wei | H04W 56/003 |

FOREIGN PATENT DOCUMENTS

| | | |
|---|---|---|
| CN | 102474838 A | 5/2012 |
| CN | 105191453 A | 12/2015 |
| CN | 110048758 A | 7/2019 |
| CN | 110099021 A | 8/2019 |
| CN | 110113122 A | 8/2019 |
| GB | 2580414 A | 7/2020 |
| WO | 2018222848 A1 | 12/2018 |
| WO | 2019074982 A1 | 4/2019 |

OTHER PUBLICATIONS

Samsung: "Discussion on OTA timing alignment for IAB", 3GPP Draft; R4-905415_IAB_T_DELTA_FINAL, 3rd Generation Partnership Project (3GPP), Mobile Competence Centre; 650, Route Des Lucioles; F-06921 Sophia-Antipolis Cedex; France, vol. RAN WG4, No. Reno, Nevada, US; May 13, 2019-May 17, 2019 3 Ma (Year: 2019).*

"Discussion on OTA Timing Alignment for IAB," Agenda Item: 8.5.4, Source: Samsung, Document for: Discussion, 3GPP TSG-RAN WG4 Meeting #91, R4-1905415, Reno, Nevada, US, May 13-17, 2019, 6 pages.

"IAB Case #1 Timing," Agenda Item: 7.2.3.5, Source: Nokia, Nokia Shanghai Bell, Document for: Discussion and Decision, 3GPP TSG RAN WG1#96, R1-1902434, Athens, Greece, Feb. 25-Mar. 1, 2019, 3 pages.

"OTA Timing Alignment for IAB Networks," Agenda Item: 8.5.4, Source: Qualcomm Incorporated, Document for: Approval, 3GPP TSG-RAN WG4 RAN4#91, R4-1907184, Reno, Nevada, May 13-17, 2019, 5 pages.

Huawei, HiSilicon, "DL transmission timing alignment for IAB", 3GPP TSG RAN WG1 Meeting #98 R1-1908037, Aug. 26-30, 2019, 4 pages, Prague, Czech Republic.

Huawei, HiSilicon, "DL transmission timing alignment for IAB", 3GPP TSG RAN WG1 Meeting #96bis R1-1903939, Apr. 8-12, 2019, 6 pages, Xi'an, China.

Huawei, HiSilicon, "DL transmission timing alignment for IAB", 3GPP TSG RAN WG1 Meeting #97 R1-1906002, May 13-17, 2019, 6 pages, Reno, USA.

Qualcomm Incorporated, "Updated IAB node synchronization framework", 3GPP TSG RAN WG1 Meeting #97 R1-1907268, May 13-May 17, 2019, 5 pages, Reno, USA.

Qualcomm Incorporated, "IAB node synchronization framework (revision of R1-1909251)", 3GPP TSG RAN WG1 Meeting #98 R1-1909525, Aug. 26-Aug. 30, 2019, 5 pages, Prague, Czech Republic.

3GPP TS 38.213 V15.6.0 (Jun. 2019), 3rd Generation Partnership Project; Technical Specification Group Radio Access Network; NR; Physical layer procedures for control(Release 15), 107 pages.

3GPP TS 38.321 V15.6.0 (Jun. 2019), 3rd Generation Partnership Project; Technical Specification Group Radio Access Network; NR; Medium Access Control (MAC) protocol specification(Release 15), 78 pages.

"[DRAFT] Reply LS on OTA timing alignment for IAB," Response to: R1-1903810 (R4-1902804), R1-1905842 (R4-1905306), Release: Rel-16, Work Item: NR_IAB-core, Source: RAN WG4, To: RAN WG1, 3GPP TSG-RAN WG4 Meeting #91, R4-1905416, Reno, USA, May 13-17, 2019, 2 pages.

* cited by examiner

TIMING SYNCHRONIZATION METHOD AND APPARATUS

CROSS-REFERENCE TO RELATED APPLICATIONS

This application is a continuation of International Application No. PCT/CN2020/084061, filed on Apr. 9, 2020, which claims priority to International Patent Application No. PCT/CN2019/109634, filed on Sep. 30, 2019 and International Patent Application No. PCT/CN2019/102605, filed on Aug. 26, 2019 and International Patent Application No. PCT/CN2019/101213, filed on Aug. 16, 2019. All of the aforementioned patent applications are hereby incorporated by reference in their entireties.

TECHNICAL FIELD

This application relates to the field of communications technologies, and in particular, to a timing synchronization method and an apparatus.

BACKGROUND

With continuous development of mobile communications technologies, spectrum resources become increasingly insufficient. To improve spectrum utilization, base stations are to be deployed more densely in the future. In addition, because of dense deployment, coverage holes can be avoided. In a conventional cellular network architecture, a base station establishes a connection to a core network (CN) by using an optical fiber. However, deployment of optical fibers is costly in many scenarios. A wireless relay node (RN) establishes a connection to the core network through a wireless backhaul link, to reduce a part of costs of deployment of optical fibers.

In-band relay is a relay solution in which a backhaul link and an access link share a same frequency band. Because no additional spectrum resource is used, the in-band relay has advantages such as high spectral efficiency and low deployment costs. The in-band relay is usually subject to a half-duplex constraint. Specifically, when receiving a downlink signal sent by a parent node of a relay node, the relay node cannot send a downlink signal to a child node of the relay node, and when receiving an uplink signal sent by the child node of the relay node, the relay node cannot send an uplink signal to the parent node of the relay node. An in-band relay solution of fifth generation communications system (5th generation mobile networks or 5th generation wireless systems, 5G) new radio (NR) is referred to as integrated access and backhaul (IAB), and a relay node is referred to as an IAB node or a relay transmission reception point (rTRP).

In NR, it is considered that the IAB supports multi-level relay, that is, one relay node may access a network through another relay node. Because a subcarrier spacing supported in both the multi-level relay and NR may be larger (for example, a higher frequency) than that supported in long term evolution (LTE), higher timing precision is required. In a relay system, it is very important to maintain synchronization between relay nodes and between a relay node and a donor base station, and synchronization precision affects performance of the entire system. For example, after accessing a network, a relay node needs to determine a downlink sending time. Due to a cost limitation, some IAB nodes may not have a precise clock such as a global positioning system (GPS). Consequently, a downlink sending time cannot be accurately determined.

SUMMARY

This application provides a timing synchronization method and an apparatus, to improve precision of a downlink transmit timing of a relay node.

According to a first aspect, a timing synchronization method is provided. The method is performed by a node that may be denoted as a first node. The first node may be an IAB node, a relay node, or any relay device. The method includes the following steps: The first node receives first indication information from a donor node, where the first indication information is used to indicate information about a plurality of second nodes, and the second node is a parent node of the first node. The first node receives a plurality of pieces of timing information from the plurality of second nodes. The first node determines a first downlink transmit timing of the first node based on the plurality of pieces of timing information. In this way, the second node indicated by the first indication information may be a parent node with higher timing precision, and the first node may selectively receive timing information of the parent node with higher timing precision, thereby improving precision of a downlink transmit timing. The first node may comprehensively use the timing information of the plurality of second nodes, so that a determined downlink transmit timing has higher accuracy, thereby improving precision of the downlink transmit timing. According to the method, signaling exchanged between the first node and the donor node is further reduced.

In a possible design, the first node receives second indication information from the donor node, where the second indication information is used to indicate at least one of the following information: timing precision of the plurality of second nodes; weights of the plurality of second nodes; or weight intermediate values of the plurality of second nodes, where the weight intermediate value is used to determine a weight; or information about a group of the plurality of second nodes, where there is a correspondence between the group and timing precision, or there is a correspondence between the group and a weight intermediate value, or there is a correspondence between the group and a weight. Based on the second indication information, the first node may refer to information such as the weight of each second node in a process of determining a downlink transmit timing by using the timing information of the plurality of second nodes, so that the determined downlink transmit timing is more accurate.

In a possible design, the first node determines the weights of the plurality of second nodes based on the timing precision of the plurality of second nodes; or the first node performs normalization processing on the weight intermediate values of the plurality of second nodes, to obtain the weights of the plurality of second nodes; or the first node determines a weight of a second node in the group based on the information about the group of the plurality of second nodes.

In a possible design, that the first node determines the first downlink transmit timing of the first node based on the plurality of pieces of timing information is specifically implemented in the following manner: The first node determines the first downlink transmit timing of the first node based on the plurality of pieces of timing information and the weights of the plurality of second nodes, where the plurality of second nodes correspond to the plurality of pieces of timing information. A downlink transmit timing that is determined by referring to the weight of each second node is more accurate.

In a possible design, the first node determines a plurality of second downlink transmit timings of the first node based on the plurality of pieces of timing information; and the first node performs weighted averaging processing on the plurality of second downlink transmit timings, to obtain the first downlink transmit timing. The plurality of second downlink transmit timings are determined based on the timing information of the plurality of second nodes, and weighted averaging is performed on the plurality of second downlink transmit timings, to obtain a final downlink transmit timing. In this way, the determined downlink transmit timing has higher precision.

In a possible design, the first node performs weighted averaging processing on the plurality of second downlink transmit timings based on the weights of the plurality of second nodes. Timing information of a second node having a higher weight is more conducive to improving precision of a downlink transmit timing of the first node.

In a possible design, the first node determines a plurality of second downlink transmit timings of the first node based on the plurality of pieces of timing information; the first node determines the smallest value and the largest value in the plurality of second downlink transmit timings; and the first node determines that the first downlink transmit timing is a value between the smallest value and the largest value. The first node may adjust a downlink transmit timing with a specific degree of freedom. In some cases, resource utilization may be increased.

In a possible design, the first node determines a plurality of second downlink transmit timings of the first node based on the plurality of pieces of timing information; and the first node uses any one of the plurality of second downlink transmit timings as the first downlink transmit timing of the first node. The first node may adjust a downlink transmit timing with a specific degree of freedom. In some cases, resource utilization may be increased.

In a possible design, the first indication information is a set or a list, and the set or the list includes identifiers of the plurality of second nodes.

In a possible design, when the first node receives third indication information from the donor node, where the third indication information is used to indicate information about a plurality of parent nodes, the first node updates the downlink transmit timing; or when the first node receives a plurality of pieces of updated timing information from the plurality of second nodes, the first node updates the downlink transmit timing; or when the downlink transmit timing is not equal to an actual transmit timing, the first node updates the downlink transmit timing. In this way, when a deviation occurs or latest indication information is obtained, a downlink transmit timing can be updated in time, thereby ensuring accuracy of the downlink transmit timing.

According to a second aspect, a timing synchronization method is provided. The method may be performed by a donor node, and a plurality of second nodes and a first node may be connected to the donor node. The method includes the following steps: The donor node obtains information about the plurality of second nodes. The donor node sends first indication information to the first node, where the first indication information is used to indicate the information about the plurality of second nodes, and the second node is a parent node of the first node. In this way, the second node indicated by the first indication information may be a parent node with higher timing precision, and the first node may selectively receive timing information of the parent node with higher timing precision, thereby improving precision of a downlink transmit timing. The first node may comprehensively use the timing information of the plurality of second nodes, so that a determined downlink transmit timing has higher accuracy, thereby improving precision of the downlink transmit timing. According to the method, signaling exchanged between the first node and the donor node is further reduced.

In a possible design, the donor node sends second indication information to the first node, where the second indication information is used to indicate at least one of the following information: timing precision of the plurality of second nodes; weights of the plurality of second nodes; or weight intermediate values of the plurality of second nodes, where the weight intermediate value is used to determine a weight; or information about a group of the plurality of second nodes, where there is a correspondence between the group and timing precision, or there is a correspondence between the group and a weight intermediate value, or there is a correspondence between the group and a weight. Based on the second indication information, the first node may refer to information such as the weight of each second node in a process of determining a downlink transmit timing by using the timing information of the plurality of second nodes, so that the determined downlink transmit timing is more accurate.

In a possible design, the donor node may further receive a plurality of second downlink transmit timings from the first node, determines a first downlink transmit timing based on the weights of the plurality of second nodes, and sends the first transmit timing to the first node.

According to a third aspect, an apparatus is provided. The apparatus may be a node that is denoted as a first node; may be an apparatus located in a node; or may be an apparatus that can match and be used with a node. In a design, the apparatus may include modules that are in a one-to-one correspondence with the method/operations/steps/actions described in the first aspect. The modules may be implemented by a hardware circuit, software, or a combination of a hardware circuit and software. In a design, the apparatus may include a processing module and a communications module. The processing module is configured to invoke the communications module to perform a receiving and/or sending function. An example is described as follows:

The communications module is configured to receive first indication information from a donor node, where the first indication information is used to indicate information about a plurality of second nodes, and the second node is a parent node of the first node; and configured to receive a plurality of pieces of timing information from the plurality of second nodes.

The processing module is configured to determine a first downlink transmit timing of the first node based on the plurality of pieces of timing information.

In a possible design, the communications module is configured to receive second indication information from the donor node, where the second indication information is used to indicate at least one of the following information: timing precision of the plurality of second nodes; weights of the plurality of second nodes; or weight intermediate values of the plurality of second nodes, where the weight intermediate value is used to determine a weight; or information about a group of the plurality of second nodes, where there is a correspondence between the group and timing precision, or there is a correspondence between the group and a weight intermediate value, or there is a correspondence between the group and a weight. Based on the second indication information, the first node may refer to information such as the weight of each second node in a process of determining a downlink transmit timing by using the timing information of the plurality of second nodes, so that the determined downlink transmit timing is more accurate.

In a possible design, the processing module is configured to determine the weights of the plurality of second nodes based on the timing precision of the plurality of second nodes; or configured to perform normalization processing on the weight intermediate values of the plurality of second nodes, to obtain the weights of the plurality of second nodes; or configured to determine a weight of a second node in the group based on the information about the group of the plurality of second nodes.

In a possible design, the processing module is configured to determine the first downlink transmit timing of the first node based on the plurality of pieces of timing information and the weights of the plurality of second nodes, where the plurality of second nodes correspond to the plurality of pieces of timing information. A downlink transmit timing that is determined by referring to the weight of each second node is more accurate.

In a possible design, the processing module is configured to determine a plurality of second downlink transmit timings of the first node based on the plurality of pieces of timing information; and configured to perform weighted averaging processing on the plurality of second downlink transmit timings, to obtain the first downlink transmit timing. The plurality of second downlink transmit timings are determined based on the timing information of the plurality of second nodes, and weighted averaging is performed on the plurality of second downlink transmit timings, to obtain a final downlink transmit timing. In this way, the determined downlink transmit timing has higher precision.

In a possible design, the processing module is configured to perform weighted averaging processing on the plurality of second downlink transmit timings based on the weights of the plurality of second nodes. Timing information of a second node having a higher weight is more conducive to improving precision of a downlink transmit timing of the first node.

In a possible design, the processing module is configured to determine a plurality of second downlink transmit timings of the first node based on the plurality of pieces of timing information; configured to determine the smallest value and the largest value in the plurality of second downlink transmit timings; and configured to determine that the first downlink transmit timing is a value between the smallest value and the largest value. The first node may adjust a downlink transmit timing with a specific degree of freedom. In some cases, resource utilization may be increased.

In a possible design, the processing module is configured to determine a plurality of second downlink transmit timings of the first node based on the plurality of pieces of timing information; and configured to use any one of the plurality of second downlink transmit timings as the first downlink transmit timing of the first node. The first node may adjust a downlink transmit timing with a specific degree of freedom. In some cases, resource utilization may be increased.

In a possible design, the first indication information is a set or a list, and the set or the list includes identifiers of the plurality of second nodes.

In a possible design, when the communications module receives third indication information from the donor node, where the third indication information is used to indicate information about a plurality of parent nodes, the processing module is further configured to update the downlink transmit timing; or when the communications module is configured to receive a plurality of pieces of updated timing information from the plurality of second nodes, the processing module is further configured to update the downlink transmit timing; or when the downlink transmit timing is not equal to an actual transmit timing, the processing module is further configured to update the downlink transmit timing. In this way, when a deviation occurs or latest indication information is obtained, a downlink transmit timing can be updated in time, thereby ensuring accuracy of the downlink transmit timing.

According to a fourth aspect, an apparatus is provided. The apparatus may be a node that is denoted as a donor node; may be an apparatus located in a node; or may be an apparatus that can match and be used with a node. A plurality of second nodes and a first node may be connected to the apparatus. In a design, the apparatus may include modules that are in a one-to-one correspondence with the method/operations/steps/actions described in the first aspect. The modules may be implemented by a hardware circuit, software, or a combination of a hardware circuit and software. In a design, the apparatus may include a processing module and a communications module. The processing module is configured to invoke the communications module to perform a receiving and/or sending function. An example is described as follows:

The processing module is configured to obtain information about the plurality of second nodes. The communications module is configured to send first indication information to the first node, where the first indication information is used to indicate the information about the plurality of second nodes, and the second node is a parent node of the first node. In this way, the second node indicated by the first indication information may be a parent node with higher timing precision, and the first node may selectively receive timing information of the parent node with higher timing precision, thereby improving precision of a downlink transmit timing. The first node may comprehensively use the timing information of the plurality of second nodes, so that a determined downlink transmit timing has higher accuracy, thereby improving precision of the downlink transmit timing. According to the method, signaling exchanged between the first node and the donor node is further reduced.

In a possible design, the communications module is further configured to send second indication information to the first node, where the second indication information is used to indicate at least one of the following information: timing precision of the plurality of second nodes; weights of the plurality of second nodes; or weight intermediate values of the plurality of second nodes, where the weight intermediate value is used to determine a weight; or information about a group of the plurality of second nodes, where there is a correspondence between the group and timing precision, or there is a correspondence between the group and a weight intermediate value, or there is a correspondence between the group and a weight. Based on the second indication information, the first node may refer to information such as the weight of each second node in a process of determining a downlink transmit timing by using the timing information of the plurality of second nodes, so that the determined downlink transmit timing is more accurate.

In a possible design, the communications module may further receive a plurality of second downlink transmit timings from the first node; and the processing module is further configured to: determine a first downlink transmit timing based on the weights of the plurality of second nodes, and send the first transmit timing to the first node.

According to a fifth aspect, an embodiment of this application provides an apparatus. The apparatus includes a communications interface and a processor, and the communications interface is used by the apparatus to communicate with another device, for example, to send and receive data or a signal. For example, the communications interface may be a transceiver, a circuit, a bus, a module, or another type of communications interface, and the another device may be a donor node. The processor is configured to invoke a set of programs, instructions, or data to perform the method described in the first aspect. The apparatus may further include a memory, configured to store the programs, the instructions, or the data to be invoked by the processor. The memory is coupled to the processor, and when executing the instructions or the data stored in the memory, the processor can implement the method described in the first aspect.

According to a sixth aspect, an embodiment of this application provides an apparatus. The apparatus includes a communications interface and a processor, and the communications interface is used by the apparatus to communicate with another device, for example, to send and receive data or a signal. For example, the communications interface may be a transceiver, a circuit, a bus, a module, or another type of communications interface, and the another device may be a first node, for example, an IAB node. The processor is configured to invoke a set of programs, instructions, or data to perform the method described in the second aspect. The apparatus may further include a memory, configured to store the programs, the instructions, or the data to be invoked by the processor. The memory is coupled to the processor, and when executing the instructions or the data stored in the memory, the processor can implement the method described in the second aspect.

According to a seventh aspect, an embodiment of this application further provides a computer-readable storage medium. The computer storage medium stores a computer-readable instruction, and when the computer-readable instruction is run on a computer, the computer is enabled to perform the method according to any one of the first aspect or the possible designs of the first aspect.

According to an eighth aspect, an embodiment of this application further provides a computer-readable storage medium, including an instruction. When the instruction is run on a computer, the computer is enabled to perform the method according to any one of the second aspect or the possible designs of the second aspect.

According to a ninth aspect, an embodiment of this application provides a chip system. The chip system includes a processor, and may further include a memory, and is configured to implement the method according to any one of the first aspect or the possible designs of the first aspect. The chip system may include a chip, or may include a chip and another discrete component.

According to a tenth aspect, an embodiment of this application provides a chip system. The chip system includes a processor, and may further include a memory, and is configured to implement the method according to any one of the second aspect or the possible designs of the second aspect. The chip system may include a chip, or may include a chip and another discrete component.

According to an eleventh aspect, an embodiment of this application further provides a computer program product, including an instruction. When the computer program product runs on a computer, the computer is enabled to perform the method according to any one of the first aspect or the possible designs of the first aspect, or perform the method according to any one of the second aspect or the possible designs of the second aspect.

According to a twelfth aspect, an embodiment of this application provides a system. The system includes the apparatus according to the third aspect or the fifth aspect and the apparatus according to the fourth aspect or the sixth aspect.

DETAILED DESCRIPTION OF ILLUSTRATIVE EMBODIMENTS

Embodiments of this application provide a timing synchronization method and an apparatus, to improve precision of a downlink transmit timing of a relay node. The method and the apparatus are based on a same inventive concept. Because a problem-resolving principle of the method is similar to that of the apparatus, mutual reference may be made to implementations of the apparatus and the method. Repeated parts are not described in detail again. In descriptions of the embodiments of this application, the term "and/or" describes an association relationship for describing associated objects and represents that three relationships may exist. For example, A and/or B may represent the following three cases: Only A exists, both A and B exist, and only B exists. The character "/" generally represents an "or" relationship between the associated objects. In this application, "at least one" means one or more, and "a plurality of" means two or more. In addition, it should be understood that, in descriptions of this application, terms such as "first" and "second" are merely used for differentiation and description, but cannot be understood as an indication or implication of relative importance or an indication or implication of an order.

A communication method provided in the embodiments of this application may be applied to a 4th generation (4G) communications system, for example, a long term evolution (LTE) system; a 5th generation (5G) communications system, for example, a new radio (NR) system; or various future communications systems, for example, a 6th generation (6G) communications system.

The following describes in detail the embodiments of this application with reference to the accompanying drawings.

Figure 1:
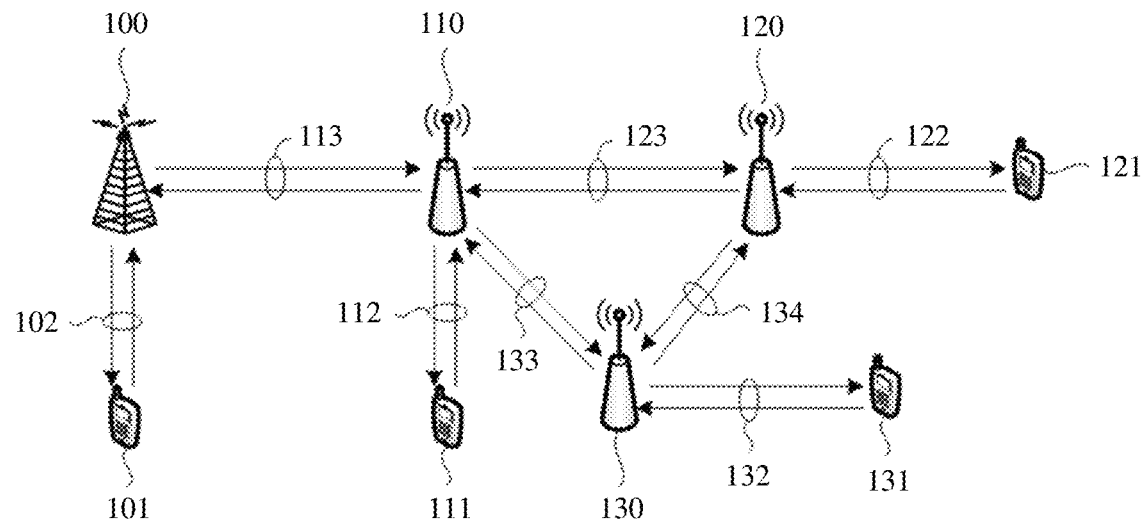
FIG. 1 is a schematic structural diagram of a communications system according to an embodiment of this application.

FIG. 1 is a schematic structural diagram of a communications system to which embodiments of this application are applicable. In the communications system shown in FIG. 1, an IAB system is provided. One IAB system includes at least one base station 100, one or more terminals 101 served by the base station 100, one or more relay nodes (RNs), and one or more terminals served by the one or more relay nodes. In the embodiments of this application, the relay node may also be referred to as a relay device, an IAB node, an IAB device, or a relay transmission reception point (rTRP).

For example, the IAB system shown in FIG. 1 includes relay nodes: an rTRP 110, an rTRP 120, and an rTRP 130, one or more terminals in served by the rTRP 110, one or more terminals 121 served by the rTRP 120, and one or more terminals 131 served by the rTRP 130. Usually, the base station 100 is referred to as a donor base station (donor next generation node B, DgNB). The rTRP no is connected to the base station 100 through a wireless backhaul link 113. The rTRP 120 is connected to the relay node rTRP 110 through a wireless backhaul link 123 to access a network. The rTRP 130 is connected to the relay node rTRP no through a wireless backhaul link 133 to access the network. The rTRP 120 serves the one or more terminals 121, and the rTRP 130 serves the one or more terminals 131. In FIG. 1, both the relay nodes rTRP no and rTRP 120 are connected to the network through the wireless backhaul links. In this application, the wireless backhaul links are all considered from a perspective of the relay nodes. For example, the wireless backhaul link 113 is a backhaul link of the relay node rTRP 110, and the wireless backhaul link 123 is a backhaul link of the relay node rTRP 120. As shown in FIG. 1, a relay node (for example, the relay node 120) may be connected to another relay node 110 through a wireless backhaul link (for example, the wireless backhaul link 123), to connect to the network. In addition, the relay node may connect to the network through a plurality of levels of wireless relay nodes.

In the embodiments of this application, the donor base station may also be referred to as a donor node, or referred to as an IAB donor. The base station includes but is not limited to an evolved NodeB (evolved node base, eNB), a radio network controller (RNC), a NodeB (node B, NB), a base station controller (BSC), a base transceiver station (BTS), a home base station (for example, a home evolved nodeB, or a home node B, HNB), a baseband unit (BBU), a new radio base station (for example, a gNB), or the like.

It may be understood that the IAB system may further include more or fewer relay nodes.

Usually, a node that provides a resource of the wireless backhaul link, for example, the relay node no, is referred to as a parent node of the relay node 120, and the relay node 120 is referred to as a child node of the relay node no. Usually, a child node may be considered as a terminal of a parent node. It should be understood that, in the IAB system shown in FIG. 1, one relay node is connected to one parent node. However, in a future relay system, to improve reliability of the wireless backhaul link, there may be a plurality of parent nodes that simultaneously serve one relay node (for example, the relay node 120). The rTRP 130 in FIG. 1 may further be connected to the relay node rTRP 120 through a backhaul link 134. That is, both the rTRP no and the rTRP 120 are parent nodes of the rTRP 130. In this application, the terminal 101, the terminal 111, the terminal 121, and the terminal 131 may each be a static or mobile device. For example, the mobile device may be a mobile phone, an intelligent terminal, a tablet computer, a notebook computer, a video game console, a multimedia player, or even a mobile relay node. The static device is usually located at a fixed position, for example, a computer, or an access point (connecting to a network through a wireless link, for example, a static relay node). Names of the relay nodes rTRPs 110, 120, and 130 do not constitute a limitation on a scenario or a network in which the relay nodes rTRPs 110, 120, and 130 are deployed, and there may be any other name such as relay or RN. In this application, the rTRP is used only for ease of description.

In FIG. 1, the wireless links 102, 112, 122, 132, 113, 123, 133, and 134 may be bidirectional links, including uplink and downlink transmission links. Particularly, the wireless backhaul links 113, 123, 133, and 134 may be used by a parent node for serving a child node. For example, the parent node 100 provides a wireless backhaul service for the child node 110. It should be understood that an uplink and a downlink of the backhaul link may be separated. To be specific, transmission on the uplink and transmission on the downlink are not performed through a same node. Downlink transmission means that a parent node transmits information or data to a child node. For example, the node 100 transmits information or data to the node 110. Uplink transmission means that a child node transmits information or data to a parent node. For example, the node 110 transmits information or data to the node 100. The node is not limited to a network node or a terminal. For example, in a D2D scenario, a terminal may be used as a relay node to serve another terminal. In some scenarios, the wireless backhaul link may also be an access link. For example, the backhaul link 123 may also be considered as an access link for the node 110, and the backhaul link 113 is also an access link for the node 100. It should be understood that the parent node may be a base station or a relay node, and the child node may be a relay node or a terminal having a relay function. For example, in the D2D scenario, the child node may also be a terminal.

In this application, the base station includes but is not limited to an evolved node B (evolved node base, eNB), a radio network controller (RNC), a NodeB (node B, NB), a base station controller (BSC), a base transceiver station (BTS), a home base station (for example, a home evolved NodeB, or a home node B, HNB), a baseband unit (BBU), an eLTE (evolved LTE) base station, an NR base station (next generation node B, gNB), a base station in a next generation communications system, or the like.

The IAB node is a specific name of the relay node, and does not constitute a limitation on the solutions of this application. The IAB node may be one of the foregoing base stations or terminal devices that have a forwarding function, or may be in an independent device form. In this application, the IAB node may be any node or device that has a relay function. For example, the IAB node may be a module or an apparatus disposed on a moving object, and the moving object includes but is not limited to a device in the Internet of Things, for example, a car, a train, or an airplane. It should be understood that use of the IAB node and use of the relay node in this application have a same meaning.

The terminal device includes but is not limited to: any one of user equipment (UE), a mobile station, an access terminal, a subscriber unit, a subscriber station, a mobile station, a remote station, a remote terminal, a mobile device, a terminal, a wireless communications device, a user agent, a station (ST) in a wireless local area network (wireless local access network, WLAN), a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a mobile station in a future 5G network, a terminal device in a future evolved public land mobile network (PLMN) network, and the like.

In FIG. 1, the donor node is a node through which access to a core network can be implemented, or is an anchor base station in a radio access network, where a network can be accessed through the anchor base station. The anchor base station is responsible for data processing at a packet data convergence protocol (PDCP) layer, or responsible for receiving data from the core network and forwarding the data to the relay node, or receiving data from the relay node and forwarding the data to the core network.

Figure 2:
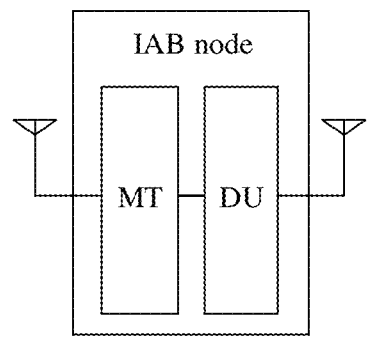
FIG. 2 is a schematic structural diagram of an IAB node according to an embodiment of this application.

For any relay node (or IAB node), two parts are included, and are configured to implement functions similar to those of a base station and functions similar to those of a terminal. Referring to FIG. 2, the IAB node may include two parts: a mobile terminal (mobile termination, MT) and a distributed unit (DU). The MT is a functional module configured to implement a function similar to that of a common terminal, and is configured to communicate with a parent node, for example, send uplink (UL) data to the parent node, and receive downlink (DL) data from the parent node. The DU is a functional module configured to implement a function similar to that of a common base station, and is configured to communicate with a child node, for example, send downlink (DL) data to the child node, and receive uplink (UL) data from the child node.

After the relay node (or the IAB node) accesses the network, a downlink sending time needs to be set, that is, the downlink sending time needs to be synchronized with a downlink transmit timing of the parent node or the donor node. In actual application, a requirement for precision of downlink timing synchronization of the relay node is relatively high. For example, in a TDD system, a maximum inter-cell timing error (3 µs) is specified in a protocol, and a downlink transmit timing of the IAB node should also meet this constraint. In the embodiments of this application, to meet a timing synchronization requirement with limited costs, air interface information may be used to assist downlink timing synchronization of the IAB node.

Based on the foregoing description, the following describes a specific process of the timing synchronization method in the embodiments of this application.

In the embodiments of this application, a timing synchronization method for a node is described. The node may be a base station, a relay node, an IAB node, a terminal having a relay function, or any device having a relay function. To better understand the method provided in the embodiments of this application, in a process of describing the solutions, an example in which a node is an IAB node is used in description of examples.

In a relay system, a node may have a plurality of parent nodes. Some possible scenarios in which one node has a plurality of parent nodes include: 1. a multi-connectivity scenario, for example, dual connectivity (DC); 2. a parent node change scenario, for example, a handover from a parent node to another parent node; and 3. a multi-TRP transmission scenario. Certainly, there may be another scenario, or several scenarios in the foregoing examples may be combined. For example, a node is handed over from a parent node to another parent node, and dual connectivity is maintained. A plurality of parent nodes of one node may also be a plurality of parent nodes that are not simultaneously connected. For example, when an IAB node is handed over from a parent node to another parent node, the IAB node has a current parent node and a historical parent node.

When the IAB node has a plurality of parent nodes, an average downlink timing amount may be obtained by using timing information provided by the plurality of parent nodes. The present invention provides a method in which an IAB node may use a plurality of parent nodes to improve downlink timing precision.

Before the embodiments of this application are described, how an IAB node determines a downlink transmit timing by using a parent node is first described.

Figure 5:
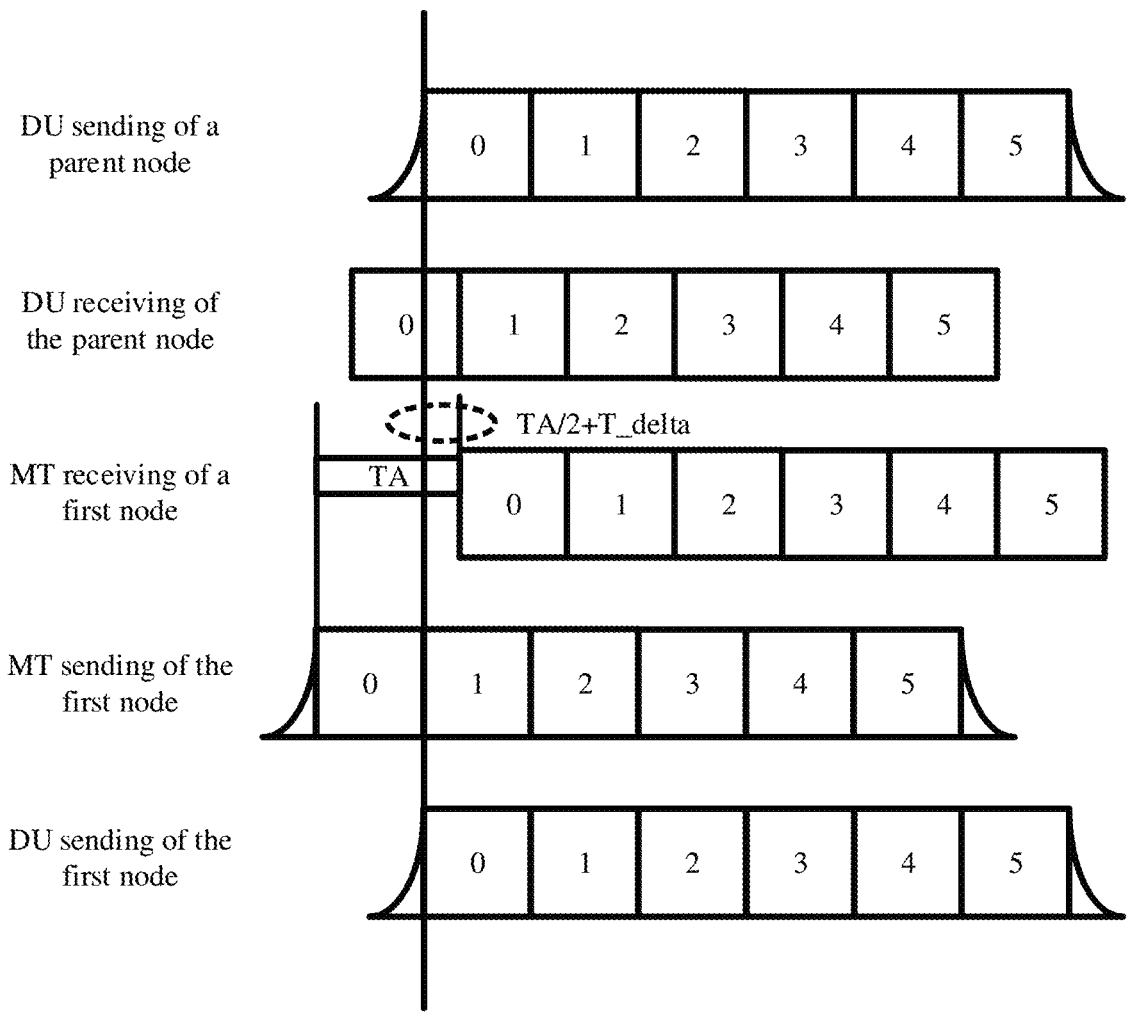
FIG. 5 is a schematic diagram of determining a downlink transmit timing by a first node according to an embodiment of this application.

It is assumed that a first node determines a downlink transmit timing by using a parent node. FIG. 5 is a schematic diagram of determining a downlink transmit timing by the first node. Sending positions in time domain are represented by 0, 1, 2, 3, 4, and 5.

A downlink transmit timing of a DU of the first node may be obtained according to the following method: A downlink transmit frame of the DU of the first node is TA/2+T_delta earlier than a downlink receive frame of an MT of the first node. In other words, for a specified time unit (for example, an $i^{th}$ frame, an $n^{th}$ subframe, or an $l^{th}$ symbol), a downlink sending time of the DU is TA/2+T_delta earlier than a downlink receiving time of the MT. TA is a timing advance of uplink transmission of the MT of the first node, that is, a timing advance by which uplink sending of the MT of the first node is earlier than downlink receiving of the MT of the first node. An initial value of the TA may be sent by a parent node to the first node, for example, by using MAC CE signaling. The parent node may update a TA value of the first node by using MAC CE signaling. In some cases, a TA value maintained by the first node may be different from the TA value sent by the parent node to the first node and updated by the parent node. In this application, a TA usually refers to the TA value maintained by the first node, but another definition is not excluded. T_delta is a timing adjustment amount delivered by the parent node to the first node, and is used to compensate for a difference between TA/2 and a transmission time Tp. The transmission time Tp is a time of transmission between the first node and the parent node.

Therefore, timing information sent by the parent node to the first node includes the timing advance TA and T_delta. T_delta is the timing adjustment amount, and is used to compensate for or correct the difference or an error between TA/2 and the transmission time Tp. The first node determines the downlink sending time of the DU of the first node based on the downlink receiving time of the MT and the timing information (TA/2+T_delta). For the $i^{th}$ frame, if the downlink receiving time of the MT of the first node is T1, the downlink sending time of the DU of the first node is T2=T1−(TA/2+T_delta).

Further, that the downlink transmit frame of the DU of the first node is TA/2+T_delta earlier than the downlink receive frame of the MT of the first node may be represented as: A difference between a transmit timing of the DU of the first node and a receive timing of the MT of the first node is $(N_{TA}+N_{TA,offset}) \cdot T_c/2 + T\_delta$. $N_{TA}$ is an index indicating the timing advance, $N_{TA,offset}$ is a timing advance offset of a serving cell, $T_c=1/(\Delta f_{max} \cdot N_f)$, $\Delta f_{max}=480 \cdot 10^3$, and $N_f=4096$. For definitions of $N_{TA}$, $N_{TA,offset}$, and $T_c$, refer to definitions in a 3GPP technical specification document.

For example, a value of T_delta satisfies the following formula:

$$T\_delta = (-N_{TA,offset}/2 + \min(N_{T\_delta,min} + n_{T\_delta} \cdot G_{T\_delta}, N_{T\_delta,max}))T_c; \text{ or}$$

$$T\_delta = (-N_{TA,offset}/2 + \max(N_{T\_delta,max} - n_{T\_delta} \cdot G_{T\_delta}, N_{T\_delta,min}))T_c.$$

In the foregoing formula, min( ) indicates taking the smaller one of $N_{T\_delta,min} + n_{T\_delta} \cdot G_{T\_delta}$ and $N_{T\_delta,max}$, and in the foregoing formula, max( ) indicates taking the larger one of $N_{T\_delta,max} - n_{T\_delta} \cdot G_{T\_delta}$ and $N_{T\_delta,min}$.

Alternatively, a boundary of a value range is not considered, or only a unilateral boundary of a value range is considered:

$$T\_delta = (-N_{TA,offset}/2 + N_{T\_delta,min} + n_{T\_delta} \cdot G_{T\_delta}) T_c; \text{ or}$$

$$T\_delta = (-N_{TA,offset}/2 + N_{T\_delta,max} - n_{T\_delta} \cdot G_{T\_delta}) T_c.$$

A value of $n_{T\_delta}$ may be configured by the parent node of the first node.

Values of $N_{T\_delta,max}$, $N_{T\_delta,min}$, and $G_{T\_delta}$ may be directly configured by the parent node, or may be directly determined by using a protocol text, or may be obtained by the first node through table lookup or in another manner. An example is described as follows:

| FR   | μ | $N_{T\_delta,max}$ | $N_{T\_delta,min}$ | $G_{T\_delta}$ |
|------|---|--------------------|--------------------|----------------|
| FR 1 | 0 | 6256               | −70528             | 64             |
|      | 1 | 6128               | −35328             | 64             |
|      | 2 | 6032               | −17664             | 64             |
| FR 2 | 2 | 6032               | −17664             | 32             |
|      | 3 | 6032               | −8816              | 32             |

In the table, μ indicates a parameter set related to a subcarrier spacing.

Specifically, μ=0 indicates that the subcarrier spacing is 15 kHz, μ=1 indicates that the subcarrier spacing is 30 kHz, μ=2 indicates that the subcarrier spacing is 60 kHz, and μ=3 indicates that the subcarrier spacing is 120 kHz. μ may be determined based on a reference parameter set of a current active BWP of the MT of the first node, or optionally, is determined by using MAC CE (multimedia access control-control element) signaling sent by another parent node. $n_{T\_delta}$ may be indicated by using multimedia access control-control element (Media Access Control-Control Element, MAC-CE) signaling. For example, $n_{T\_delta}$ is indicated by using 11-bit or 12-bit signaling, for example, by using multimedia access control-control element (Media Access Control-Control Element, MAC-CE) signaling or other signaling, and takes any value in 0 to 1200. FR in the table indicates a frequency band. For meanings of FR 1 and FR 2, refer to definitions in the 3GPP technical specification document. It should be understood that names of the parameters in the table or the formula are examples, and may have other names. This is not limited in this patent.

In different operating frequency bands, different subcarrier spacings, or different parameter sets, there are a plurality of different values of a value range, a step size, a granularity, a maximum value, and a minimum value of T_delta. Therefore, in implementations provided in this application, an agreement to summarize a plurality of values of T_delta by using one formula may be made, so that a form is simple, and this facilitates evolution and expansion.

In a possible implementation, same $N_{T\_delta,max}$ may be further defined in a standard protocol in different frequency ranges or different subcarrier spacings.

For example, the standard protocol may specify that $N_{T\_delta,max}$ in FR 1 is uniformly 6256, 6128, or 6032, that is, an association between $N_{T\_delta,max}$ and the subcarrier spacing is canceled.

Further, the standard protocol may further specify that values of $N_{T\_delta,max}$ in different frequency ranges are the same, and the value of $N_{T\_delta,max}$ may be 6256, 6128, or 6032.

In a possible implementation, values of $N_{T\_delta,min}$ in different frequency ranges are defined as $-70528/2^\mu$ or $-70656/2^\mu$ in a protocol.

For example, the value of T_delta satisfies the following formula:

$$T\_delta = (-N_{TA,offset}/2 + \min(N_{T\_delta,min} + n_{T\_delta} \cdot G_{T\_delta}, N_{T\_delta,max})) T_c.$$

In the foregoing formula, min( ) indicates taking the smaller one of $N_{T\_delta,min} + n_{T\_delta} \cdot G_{T_{delta}}$ and $N_{T\_delta,max}$. The value of $n_{T\_delta}$ may be configured by the parent node of the first node. When an operating frequency band of the first node is FR1 defined in the 3GPP standard technical specification, $G_{T\_delta}$ is 64. When an operating frequency band of the first node is FR 2 defined in the 3GPP standard technical specification, $G_{T\_delta}$ is 32.

For the values of $N_{T\_delta,max}$ and $N_{T\_delta,min}$, refer to the following table:

| FR   | μ | $N_{T\_delta,max}$ | $N_{T\_delta,min}$ |
|------|---|--------------------|--------------------|
| FR 1 | 0 | 6256               | −70528             |
|      | 1 | 6128               | −35328             |
|      | 2 | 6032               | −17664             |
| FR 2 | 2 | 6032               | −17664             |
|      | 3 | 6032               | −8816              |

For example, the first node may alternatively determine the value of T_delta according to one of the following formulas:

$$T\_delta = (-N_{TA,offset}/2 + \min(-70528/2^\mu + n_{T\_delta} \cdot 32, 6256)) T_c; \text{ or}$$

$$T\_delta = (-N_{TA,offset}/2 + \min(-70528/2^\mu + n_{T\_delta} \cdot 32, 6032)) T_c; \text{ or}$$

$$T\_delta = (-N_{TA,offset}/2 + \min(-70528/2^\mu + n_{T\_delta} \cdot 32, 6128)) T_c.$$

The value of $n_{T\_delta}$ may be configured by the parent node of the first node. In the foregoing formula, min( ) indicates taking the smallest one of two or more values, μ indicates a parameter set related to a subcarrier spacing, and specifically, a value range of μ may be 0 to 3. μ=0 indicates that the subcarrier spacing is 15 kHz, μ=1 indicates that the subcarrier spacing is 30 kHz, μ=2 indicates that the subcarrier spacing is 60 kHz, and μ=3 indicates that the subcarrier spacing is 120 kHz. A value of μ may be determined based on a reference parameter set of a current active bandwidth of the MT of the first node, or a value of μ may be determined by using signaling sent by another parent node. For example, $n_{T\_delta}$ may be indicated by using signaling, for example, indicated by using 12-bit MAC CE signaling, and takes any value in 0 to 2400. When the value of T_delta is determined by using this method, no additional table is required to determine parameter values in a plurality of operating frequency bands or subcarrier spacings. μ reflecting the subcarrier spacing is used as one of parameters for calculating the value of T_delta, so that a unified form of T_delta calculation is formed. This makes a protocol simple and easy to expand and evolve.

For example, the first node may alternatively determine the value of T_delta according to one of the following formulas:

$$T\_delta = (-N_{TA,offset}/2 + \min(-70656/2^\mu + n_{T\_delta} \cdot 32, 6256)) T_c; \text{ or}$$

$$T\_delta=(-N_{TA,offset}/2+\min(-70656/2^\mu+n_{T\_delta}\cdot 32, 6032))T_c;\text{ or}$$

$$T\_delta=(-N_{TA,offset}/2+\min(-70656/2^\mu+n_{T\_delta}\cdot 32, 6128))T_c.$$

The value of $n_{T\_delta}$ may be configured by the parent node of the first node. In the foregoing formula, min( ) indicates taking the smallest one of two or more values, μ indicates a parameter set related to a subcarrier spacing, and specifically, a value range of μ may be 0 to 3. μ=0 indicates that the subcarrier spacing is 15 kHz, μ=1 indicates that the subcarrier spacing is 30 kHz, μ=2 indicates that the subcarrier spacing is 60 kHz, and μ=3 indicates that the subcarrier spacing is 120 kHz. A value of μ may be determined based on a reference parameter set of a current active bandwidth of the MT of the first node, or a value of μ may be determined by using signaling sent by another parent node. For example, $n_{T\_delta}$ may be indicated by using signaling, for example, indicated by using 12-bit MAC CE signaling, and takes any value in 0 to 2400. When the value of T_delta is determined by using this method, no additional table is required to determine parameter values in a plurality of operating frequency bands or subcarrier spacings. μ reflecting the subcarrier spacing is used as one of parameters for calculating the value of T_delta, so that a unified form of T_delta calculation is formed. This makes a protocol simple and easy to expand and evolve.

For example, the first node may alternatively determine the value of T_delta according to the following formula:

$$T\_delta=(-N_{TA,offset}/2+\min(-70528/2^\mu+n_{T\_delta}\cdot G_{T\_delta},6256))T_c;\text{ or}$$

$$T\_delta=(-N_{TA,offset}/2\min(-70528/2^\mu+n_{T\_delta}\cdot G_{T\_delta},6032))T_c;\text{ or}$$

$$T\_delta=(-N_{TA,offset}/2\min(-70528/2^\mu+n_{T\_delta}\cdot G_{T\_delta},6128))T_c.$$

The value of $n_{T\_delta}$ may be configured by the parent node of the first node. When an operating frequency band of the first node is FR 1 defined in the 3GPP standard technical specification, $G_{T\_delta}$ is 64. When an operating frequency band of the first node is FR 2 defined in the 3GPP standard technical specification, $G_{T\_delta}$ is 32. $n_{T\_delta}$ may be indicated by using MAC-CE signaling, for example, indicated by using 11-bit MAC CE signaling, and takes any value in 0 to 1200. When T_delta is determined by using this method, only n-bit signaling is required to indicate values of T_delta in different operating frequency bands or different subcarrier spacings, thereby further reducing signaling overheads.

For example, the first node may alternatively determine the value of T_delta according to the following formula:

$$T\_delta=(-N_{TA,offset}/2+\min(N_{T\_delta,min}/2^\mu+n_{T\_delta}\cdot G_{T\_delta},N_{T\_delta,max}))T_c.$$

The value of $n_{T\_delta}$ may be configured by the parent node of the first node, $N_{T\_delta,min}$ is a minimum value specified in the standard protocol, and $N_{T\_delta,max}$ is a maximum value specified in the standard protocol. When an operating frequency band of the first node is FR 1 defined in the 3GPP standard technical specification, $G_{T\_delta}$ is 64. When an operating frequency band of the first node is FR 2 defined in the 3GPP standard technical specification, $G_{T\_delta}$ is 32. In this case, $n_{T\_delta}$ may be indicated by using MAC-CE signaling, for example, indicated by using 11-bit MAC CE signaling, and takes, for example, any value in 0 to 1200. Alternatively, the value of $G_{T\_delta}$ is fixedly 32. In this case, $n_{T\_delta}$ is indicated by using MAC-CE signaling, for example, indicated by using 12-bit MAC CE signaling, and takes, for example, any value in 0 to 2400. In this method, a manner of determining the value of T_delta is a more uniform or general expression manner. Determining of the parameters does not rely on an additional table. In addition, with evolution of the protocol, the maximum value or the minimum value may change. The manner of calculating T_delta provided in this method can adapt to evolution of the protocol without any change.

For example, the first node may alternatively determine the value of T_delta according to the following formula:

$$T\_delta=(-N_{TA,offset}/2+N_{T\_delta,max}-n_{T\_delta}\cdot G_{T\_delta})T_c.$$

The value of $n_{T\_delta}$ may be configured by the parent node of the first node. In the foregoing formula, $N_{T\_delta,max}$ may be 6256, 6128, or 6032. When an operating frequency band of the first node is FR 1 defined in the 3GPP standard technical specification, $G_{T\_delta}$ is 64. When an operating frequency band of the first node is FR 2 defined in the 3GPP standard technical specification, $G_{T\_delta}$ is 32. $n_{T\_delta}$ may be indicated by using MAC-CE signaling, DCI signaling, or other higher layer signaling, for example, indicated by using 11-bit MAC CE signaling, and takes any value in 0 to 1200. Alternatively, the value of $G_{T\_delta}$ is fixedly 32. In this case, $n_{T\_delta}$ is indicated by using MAC-CE signaling, for example, indicated by using 12-bit MAC CE signaling, and takes, for example, any value in 0 to 2400.

For example, a maximum value $n_{T\_delta\_max}$ of $n_{T\_delta}$ should select a minimum positive integer that makes $N_{T\_delta,min}/2^\mu+n_{T\_delta\_max}\cdot G_{T\_delta}\geq N_{T\_delta,max}$ true.

In a possible implementation, a value range of $n_{T\_delta}$ is not explicitly limited in a protocol, and the maximum value of $n_{T\_delta}$ is implicitly reflected based on a maximum quantity of bits supported by control signaling.

Further, the configuration information may further indicate a specific method used by the IAB node to assign a value to the TA in the timing information (TA/2+T_delta). For example, the configuration information may indicate the IAB node to determine the timing information (TA/2+T_delta) based on a TA value that is maintained when T_delta is received; or the configuration information may indicate the IAB node to determine the timing information (TA/2+T_delta) based on a TA value that is maintained in real time.

Optionally, after receiving transmit timing information, the first node feeds back the transmit timing information to the parent node or a donor node. For example, after receiving T_delta, the first node feeds back, to the parent node or the donor node, T_delta and a TA value that is currently maintained by the first node. Alternatively, after receiving T_delta, the first node feeds back, to the parent node or the donor node, T_delta and a TA value that is maintained when T_delta is received. Alternatively, the first node feeds back, to the parent node or the donor node, only a TA value that is currently maintained. Alternatively, the first node feeds back, to the parent node or the donor node, only a TA value that is maintained when T_delta is received. A feedback mechanism may enable the parent node or the donor node to confirm accuracy of the transmit timing information.

Ideally, if a time by which downlink sending of the DU of the first node is earlier than downlink receiving is Tp, synchronous sending with the parent node can be implemented, and TA/2+T_delta represents estimation of Tp by the parent node. In actual applications, a timing of the parent node may be different from an ideal timing. In addition, a propagation delay Tp estimated by the parent node is not equal to an actual propagation delay. Therefore, if the downlink transmit timing of the first node is determined depending only on timing information of a single parent node, accuracy of the downlink transmit timing may be affected, and there is a difference between the downlink transmit timing of the first node and the ideal timing. In a multi-hop scenario, the difference is transmitted hop by hop.

Figure 3:
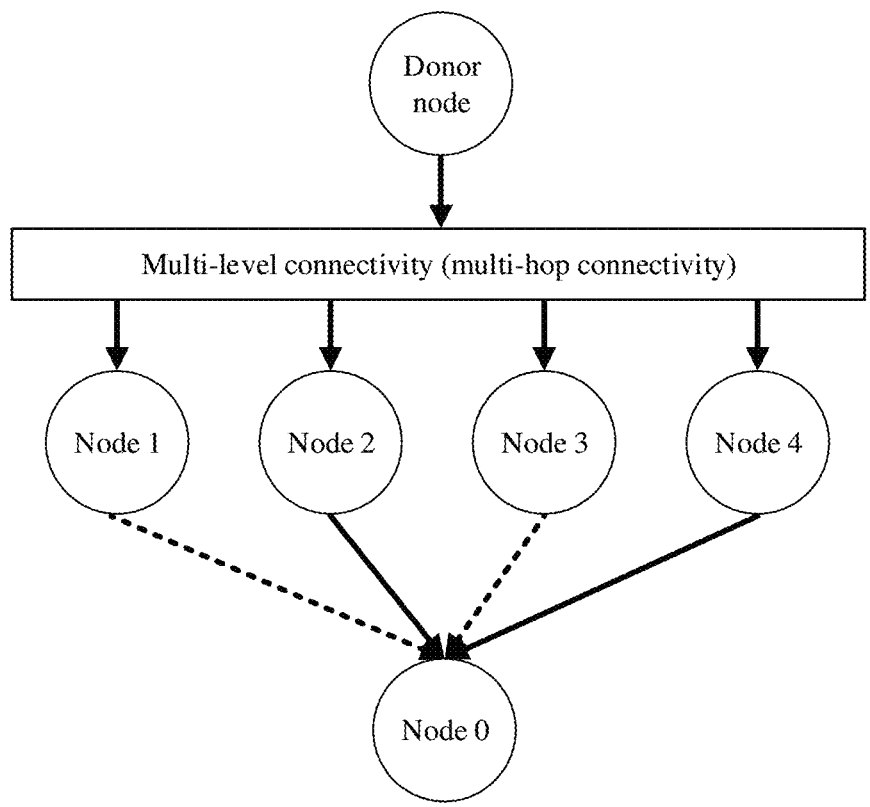
FIG. 3 is a schematic diagram of a node having a plurality of parent nodes according to an embodiment of this application.

To further improve the accuracy of the downlink transmit timing of the first node, in the embodiments of this application, the downlink transmit timing of the first node may be comprehensively determined based on timing information of a plurality of second nodes. Details are as follows:

FIG. 3 is a schematic diagram of a node having a plurality of parent nodes. A node 0 is a node for which a downlink transmit timing needs to be determined, and a node 1, a node 2, a node 3, and a node 4 are all parent nodes of the node 0. The parent node is finally connected to a donor node. It should be noted that FIG. 3 is merely an example. In practice, the parent node may also be a donor node, or different parent nodes may be connected to different donor nodes.

Figure 4:
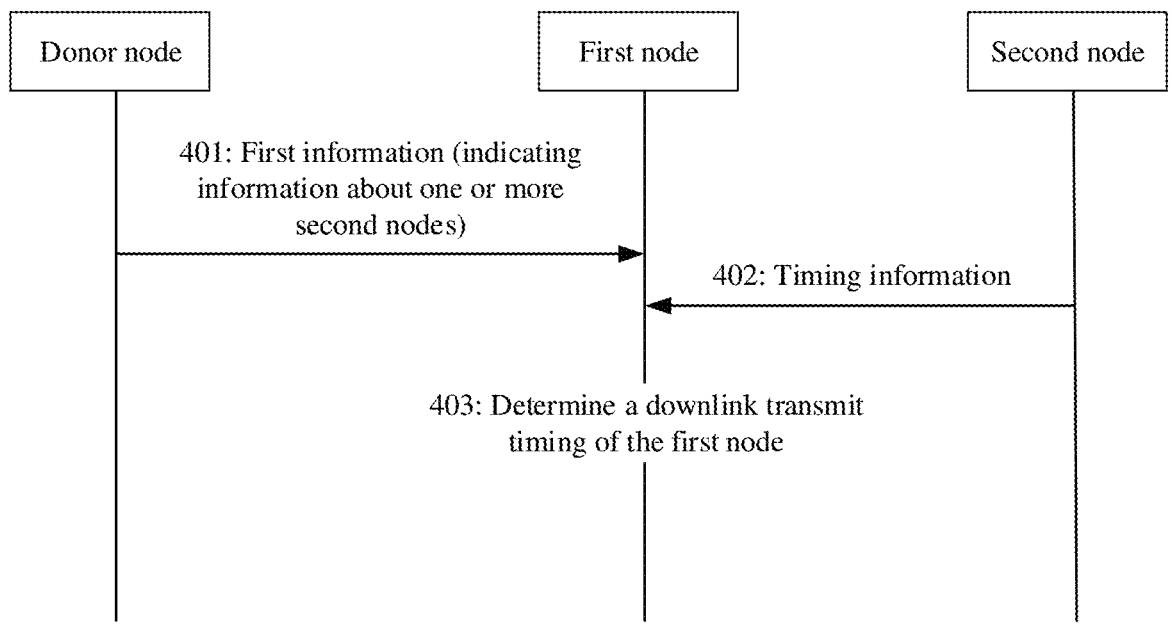
FIG. 4 is a schematic flowchart of a timing synchronization method according to an embodiment of this application.

Referring to FIG. 4, in an embodiment of this application, a specific procedure of a timing synchronization method is described below. The method is performed by a first node and a donor node, and a second node is a parent node of the first node. The first node, the second node, and the donor node each may be a base station, a relay node, an IAB node, a terminal having a relay function, or any device having a relay function.

S401: The donor node sends first indication information to the first node, and the first node receives the first indication information from the donor node.

The first indication information is used to indicate information about one or more second nodes.

In a possible implementation, the first indication information includes an identifier of the one or more second nodes. For example, the first indication information is a set or a list, and the set or the list includes the identifiers of the plurality of second nodes.

For example, after an IAB node accesses a network, the donor node sends first indication information to the IAB node, to indicate information about a plurality of parent nodes.

The first indication information may be further used to indicate the first node to receive timing information of the plurality of second nodes.

The plurality of second nodes indicated by the first indication information may be considered as timing reference nodes for downlink sending of the first node. If a second node is a timing reference node of the first node, the first node may determine a downlink transmit timing by using timing information sent by the second node.

S402: The one or more second nodes send the timing information to the first node, and the first node receives the plurality of pieces of timing information from the one or more second nodes.

In FIG. 4, one second node is used as an example.

The first node receives the timing information from each of the plurality of second nodes based on the plurality of second nodes indicated by the first indication information.

In actual application, more second nodes may send timing information to the first node. For example, the first indication information is used to indicate information about N second nodes, and M second nodes send timing information to the first node. M and N are both positive integers. The first node receives timing information from the N second nodes based on the first indication information. Alternatively, the first node receives the timing information from the M second nodes but ignores or discards timing information of a node that is not indicated by the first indication information. For example, the M second nodes and the N second nodes each may be a parent node currently connected to the first node, or a parent node to which the first node was connected, or a target node to which the first node may be handed over.

The first node may select the N second nodes based on the first indication information, or may select, in the following manners (1) to (3), a second node that can be used to determine a downlink transmit timing:

(1) The first node determines a downlink transmit timing of the first node by using only N1 parent nodes that are currently connected or were connected, and the N1 parent nodes have provided timing information for the first node, where N1≤N;

(2) when the N nodes include a parent node that has not been connected yet, after the first node is connected to the parent node and obtains timing information, the first node may determine a downlink transmit timing by using the timing information of the parent node; or (3) the first node sets a downlink transmit timing by using N2 parent nodes that are in the N parent nodes and that have provided timing information for the first node, where N2≤N.

For example, as shown in FIG. 3, the node 1 to the node 4 all send timing information to the node 0, but the node 0 obtains only the timing information of the node 2 and the node 3, and determines a downlink transmit timing based on the timing information of the node 2 and the node 3.

In this embodiment of this application, the timing information includes one or both of a timing advance (TA) or a timing offset T_delta. For definitions of the TA and T_delta, refer to the descriptions of this application or refer to descriptions of a standard proposal or a standard protocol that is disclosed before this application.

It should be understood that, when a second node is not a timing reference node of the first node, it only indicates that the first node does not use timing information of the second node to determine a downlink transmit timing. However, the first node still needs to determine an uplink transmit timing by using partial timing information (for example, a TA) provided by the second node.

In a possible implementation, the donor node may alternatively send dedicated indication information for each second node, to indicate whether the first node uses the timing information of the second node, or indicate whether the second node provides the timing information for the first node. For example, when the IAB node accesses a parent node, for example, a parent node a, the donor node sends one piece of indication information to the parent node a, where the indication information is used to indicate whether the IAB node uses timing information of the parent node a.

S403: The first node determines a downlink transmit timing of the first node based on the plurality of pieces of received timing information.

For differentiation, a finally determined downlink transmit timing of the first node is denoted as a first downlink transmit timing.

The first node receives the plurality of pieces of timing information from the plurality of second nodes, and determines a downlink transmit timing for each piece of timing information received from the second node, where the downlink transmit timing is denoted as a second downlink transmit timing. In this way, for the plurality of pieces of timing information of the plurality of second nodes, the first node may determine a plurality of second downlink transmit timings.

In a possible implementation, the first node determines second downlink transmit timings only for the N second nodes in the list. If some second nodes do not provide timing information, the first node ignores these second nodes.

For the information about the plurality of second nodes indicated by the donor node in S401, a maximum value may be configured for a quantity of second nodes, that is, the donor node does not indicate a quantity of parent nodes that exceeds the maximum value. Alternatively, when the quantity of second nodes indicated by the donor node is greater than the maximum value, the first node removes some parent nodes from the list or the set. For example, the first node may ignore a newly configured parent node, or ignore a parent node that is first configured, or ignore a parent node with relatively low precision. For details about the precision and related content, refer to the following descriptions.

In a simplest case, the donor node indicates one timing parent node only for the first node. In this case, during a handover, the first node uses timing information only of a previously configured parent node or a parent node that is newly handed over to.

In a possible implementation, during each handover, the donor node notifies the first node whether to retain previous timing information.

In a possible implementation, the first node reports a list or a set of current second nodes of the first node to the donor node. For example, when the donor node of the first node changes, a new donor node may not know information about the plurality of second nodes of the first node. In this case, the new donor node obtains the information through reporting.

When the donor node of the first node changes, a possible method is that the first node ignores all previously indicated second nodes, and uses a second node indicated by indication information delivered by a new donor.

The first node determines the first downlink transmit timing of the first node based on the plurality of second downlink transmit timings. In this embodiment of this application, two optional manners may be provided.

Manner 1: The first node performs weighted averaging processing on the plurality of second downlink transmit timings, to obtain the first downlink transmit timing.

In a process of performing weighted averaging processing, the first node may perform weighted averaging processing on the plurality of second downlink transmit timings based on weights of the plurality of second nodes. The plurality of second nodes are in a one-to-one correspondence with the plurality of pieces of timing information. Therefore, the weights of the plurality of second nodes may also be considered as weights of the plurality of pieces of timing information.

For example, a quantity of the plurality of second nodes is represented by N. The first downlink transmit timing may be calculated according to the following Formula (1) or Formula (2):

$$TT_a = \Sigma_n w_n \cdot TT_n \qquad \text{Formula (1)}$$

where $TT_a$ is the first downlink transmit timing, $TT_n$ is the second downlink transmit timing, $w_n$ is the weight of the second node, and n is index numbers of the plurality of second downlink transmit timings, and a value of n may be 0, 1, 2, . . . , or 1, 2, 3 . . . ; or $$TT_{\{1,2,N\}} = w_1 \cdot TT_1 + w_2 \cdot TT_2 + \ldots + w_N \cdot TT_N = TT_0 + w_1 \cdot E_1 + w_2 \cdot E_2 + \ldots + w_N \cdot E_N \qquad \text{Formula (2)}$$

where $TT_{\{1,2,N\}}$ is the first downlink transmit timing; $TT_i$ is a second downlink transmit timing numbered i, and i=1, 2, . . . , or N, for example, $TT_1$ is a second downlink transmit timing calculated by the first node based on a second node numbered 1; $w_i$ is a weight of a second node numbered i, or $w_i$ is a weight of the second downlink transmit timing numbered i, or $w_i$ is a weight of timing information numbered i, and i=1, 2, . . . , or N; $TT_0$ is an ideal downlink transmit timing; $E_i$ is an error of the second downlink transmit timing numbered i, and i=1, 2, . . . , or N; and $w_1+w_2+ \ldots +w_N=1$.

Manner 2: The smallest value and the largest value in the plurality of second downlink transmit timings are determined; and it is determined that the first downlink transmit timing is a value between the smallest value and the largest value.

This may be expressed by Formula (3):

$$\min\{TT_1, \ldots, TT_N\} \leq TT_a \leq \max\{TT_1, \ldots, TT_N\} \qquad \text{Formula (3)}$$

min indicates the smallest value, and max indicates the largest value. $TT_a$ is the first downlink transmit timing; and $TT_i$ is a second downlink transmit timing numbered i, and i=1, 2, . . . , or N. For example, $TT_1$ is a second downlink transmit timing calculated by the first node based on a second node numbered 1.

The first downlink transmit timing determined by the first node is located between the smallest value and the largest value in the plurality of second downlink transmit timings. In this way, the first node adjusts a downlink transmit timing with a specific degree of freedom. In some cases, resource utilization may be increased.

Alternatively, the first node may use any one of the plurality of second downlink transmit timings as the first downlink transmit timing of the first node.

In a possible implementation, the first node may obtain a timing information of a timing source other than the second node, for example, a global positioning system (GPS). In this case, the first node may jointly determine the first downlink transmit timing with reference to the timing information of the another timing source and the timing information received from the second node. For example, the first node may determine a downlink transmit timing based on the timing information of the another timing source, where the downlink transmit timing is denoted as $TT_x$.

Based on $TT_x$, the foregoing Manner 1 may be evolved into: The first node performs weighted averaging processing on the plurality of second downlink transmit timings and $TT_x$, to obtain the first downlink transmit timing.

Formula (2) may be evolved into Formula (4):

$$TT_{\{1,2,N+1\}} = w_1 \cdot TT_1 + w_2 \cdot TT_2 + \ldots + w_N \cdot TT_N + w_x \cdot TT_x = TT_0 + w_1 \cdot E_1 + w_2 E_2 + + \ldots w_N E_N + w_x E_x \qquad \text{Formula (4)}$$

The foregoing Manner 2 may be evolved into: The smallest value and the largest value in the plurality of second downlink transmit timings and $TT_x$ are determined; and it is determined that the first downlink transmit timing is any value between the smallest value and the largest value, or may be the smallest value or the largest value.

Formula (3) may be evolved into: $\min\{TT_1, \ldots, TT_N, TT_X\} \leq TT_a \leq \max\{TT_1, \ldots, TT_N, TT_X\}$.

The following describes some possible implementations in which the first node obtains the weights of the plurality of second nodes.

In a possible implementation, the weight information is prestored in the first node. For example, the weight information may be stored in a form of a list or a set. For example, weights of four second nodes respectively correspond to {1, 2, 3, 4}.

In a possible implementation, the donor node sends indication information to the first node, where the indication information is denoted as second indication information. The first node receives the second indication information from the donor node. Optionally, the first indication information and the second indication information may be carried in a same message, or may be separately carried in different messages. Alternatively, one piece of second indication information may be sent for each second node.

The second indication information is used to indicate at least one of the following information: timing precision of the plurality of second nodes, the weights of the plurality of second nodes, weight intermediate values of the plurality of second nodes, information about a group of the plurality of second nodes, a hot count of the second node, a quantity of hops between the second node and a node including an accurate clock source (for example, the GPS), or the like.

It should be understood that in a possible implementation, a part or all of the timing information of the second node may also be directly sent by the second node to the first node.

The weight intermediate value is used to determine a weight. The weight intermediate value is a quantized result, and may be several fixed values, for example, {1, 2, 3, 4} or {1, 2, 4}. The donor node sends the weight intermediate values to the first node; and the first node receives the weight intermediate values from the donor node, and performs normalization processing on the weight intermediate values, to obtain the weights of the plurality of second nodes. For example, for a parent node 1 and a parent node 2, if the donor node sends weights c_1 and c_2 of the two parent nodes to the first node, the first node may calculate normalized weights w_1=c_1/(c_1+c_2) and w_2=c_2/(c_1+c_2).

Alternatively, the donor node performs normalization processing on the weight intermediate values corresponding to the plurality of second nodes, to obtain the weights of the plurality of second nodes, and the donor node directly sends the weights of the plurality of second nodes to the first node.

A method for notifying the timing precision of the plurality of second nodes is similar to a method for notifying the weight intermediate values, that is, several fixed precision values are specified, for example, {0, 1, 2}, {0, 1, 2, 3}, or {0, 1, 2, 4}. The first node may determine a downlink timing based on the timing precision of the second nodes.

In a possible implementation, the second indication information indicates that one second node has the lowest timing precision level, or indicates that a weight or a weight intermediate value corresponding to the second node is 0. In this case, the first node does not use timing information provided by the second node to determine a downlink transmit timing.

In a possible implementation, different timing precision indicates an error range of a parent node. For example, L0 indicates that an absolute value of a timing error is greater than (or greater than or equal to) X1 microseconds; L1 indicates that an absolute value of a timing error is greater than (or greater than or equal to) X2 microseconds and less than (or less than or equal to) X1 microsecond; L2 indicates that an absolute value of a timing error is greater than (or greater than or equal to) X3 microseconds and less than (or less than or equal to) X2 microseconds; and L3 represents that an absolute value of a timing error is less than (or less than or equal to) X3 microseconds, where X1>X2>X3. For example, X1=3, X2=2, and X3=1; or X1=1.5, X2=1, and X3=0.5.

The following table may be obtained:

| Error level | Indicated error range (unit: microseconds) |
|---|---|
| L0 | E > X1 |
| L1 | X2 < E < X1 |
| L2 | X3 < E < X2 |
| L3 | E < X3 |

">" and "<" in the table may be respectively replaced with "≥" and "≤". The foregoing example provides four timing precision levels. In implementation, more or fewer timing precision levels may be defined based on a same criterion.

It should be understood that the error range herein represents an error of the second node relative to an ideal downlink timing or a reference downlink timing. The ideal downlink timing is represented as $TT_0$, and the reference downlink timing may include a downlink transmit timing of a parent node of the second node.

In another possible implementation, the second indication information further includes a stability level of the downlink transmit timing of the second node, and downlink transmit timing stability indicates a timing fluctuation status when the second node sends a downlink signal. For example, when the second node has relatively high downlink transmit timing stability, a time at which the second node sends the downlink signal does not change greatly, but when the second node has relatively low downlink transmit timing stability, the time at which the second node sends the downlink signal may change.

It should be understood that the timing precision and the timing stability may be separately defined, or may be jointly defined.

In a possible implementation, the first node or the second node reports a timing precision level or a timing stability level of the first node or the second node to the donor node.

When the second indication information sent by the donor node to the first node is used to indicate the timing precision of the plurality of second nodes, the first node may calculate or determine the weights of the plurality of second nodes based on the timing precision of the plurality of second nodes. If the donor node indicates only the timing precision of the plurality of second nodes to the first node, the first node may calculate the first downlink transmit timing of the first node in the foregoing Manner 1 or Manner 2.

The donor node can learn of the timing precision of the plurality of second nodes, but quality of channels between different second nodes and the first node may be different. Consequently, the first node and the parent node (namely, the second node) differ in estimated precision of the timing information. Therefore, even if the donor node provides the timing precision of the parent node, the first node does not necessarily set the weight strictly based on the precision. In other words, setting the weight based on the precision is an optional method.

The donor node has some prior knowledge of the timing precision of the parent node of the first node. For example, the donor node knows whether each node has a GPS, and a hop count of the parent node in a multi-hop scenario.

When the second indication information sent by the donor node to the first node is used to indicate the information about the group of the plurality of second nodes, different groups have different timing precision, different weight intermediate values, or different weights. There is a correspondence between the group and timing precision, or there is a correspondence between the group and a weight intermediate value, or there is a correspondence between the group and a weight. That is, second nodes in a same group have same or similar timing precision, or have same or similar weight intermediate values, or have same or similar weights. In this case, the second indication information may be represented in the following form:

timing node group 1: {parent node ID list}
timing node group 2: {parent node ID list}
timing node group p: {parent node ID list}

The timing node group 1 to the timing node group p represent different groups. Each group includes one or more second nodes (that is, parent nodes), and may be represented in a form of a list or a set. The list or the set includes an identifier, for example, an ID, of the parent node.

In a possible implementation, each group has a predefined weight. For example, weights of the timing node group 1 and the timing node group 2 are 2 and 1, respectively. In another possible implementation, precision (or a weight or a weight intermediate value) of the timing node group 1 is approximately two times that of the timing node group 2. Optionally, only a value relationship between precision, a value relationship between weights, or a value relationship between weight intermediate values of a plurality of groups may be specified in a protocol. For example, the protocol specifies that the timing node group 1 has higher precision than the timing node group 2.

In addition, the donor node may further notify the first node of the following information about the second node: information indicating whether a time reference of the second node is available or unavailable, information indicating whether a frequency reference of the second node is available or unavailable, and information indicating that the second node enters a timing maintained state. Herein, that the second node enters the timing maintained state indicates that the second node loses an external timing reference (for example, a GPS, the 1588 timing protocol, or an air interface based timing method described in this application), and the second node performs timing only by using a local clock.

It should be understood that in a possible implementation, a part or all of the timing information of the second node may also be directly sent by the second node to the first node.

The following describes an optional implementation in which the first node determines the second downlink timings based on the timing information of the plurality of second nodes.

Figure 6:
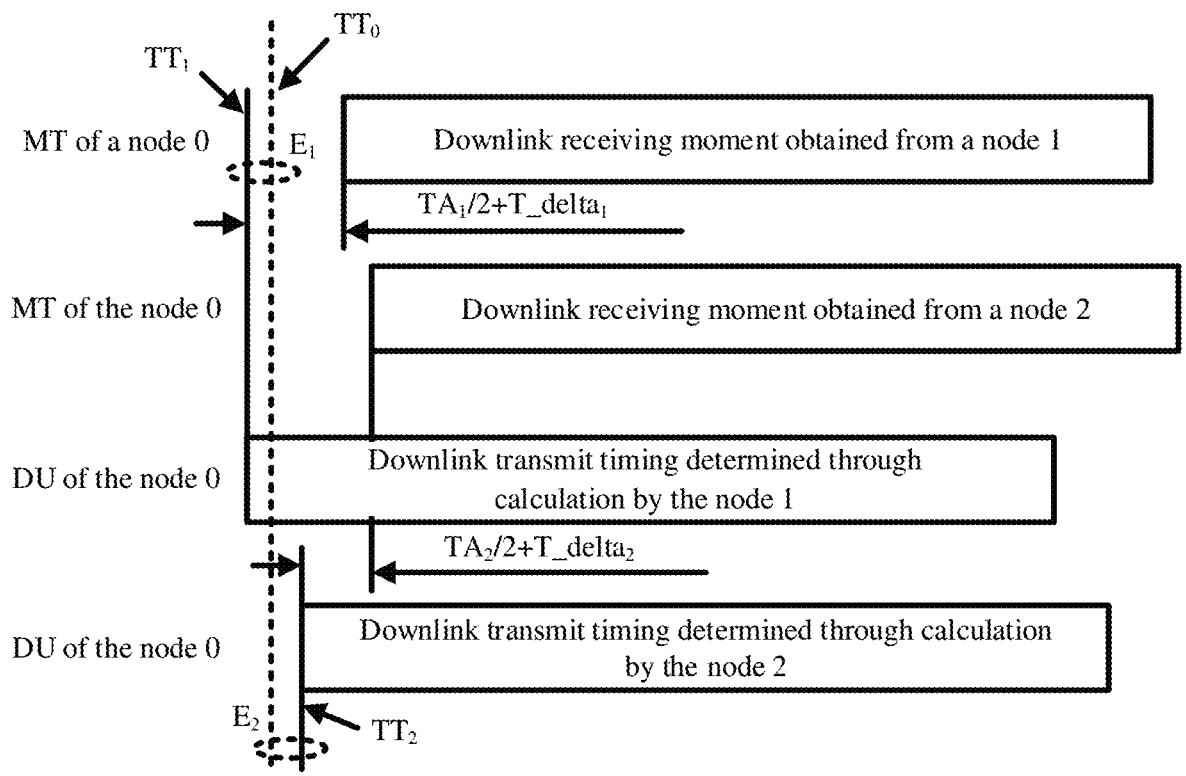
FIG. 6 is a schematic diagram of determining a downlink transmit timing by a node 0 according to an embodiment of this application.

As shown in FIG. 6, two second nodes are used as an example. In a process of describing the method, the first node is represented by a node 0, and the two second nodes are represented by a parent node 1 and a parent node 2.

The node 0 may separately receive physical channels and reference signals of the parent node 1 and the parent node 2, to separately obtain receive timings of the parent node 1 and the parent node 2. The parent node 1 and the parent node 2 each send timing information to the node 0, for example, send a TA and T_delta. The node 0 may determine a downlink transmit timing (that is, the second downlink transmit timing) based on the timing information according to the method described in FIG. 5. In this case, the node 0 may obtain two downlink transmit timings. In FIG. 6, the two downlink transmit timings are represented as TT1 and TT2, where TT1 is a downlink transmit timing determined through calculation by the node 1, and TT2 is a downlink transmit timing determined through calculation by the node 2.

As described above, there may be an error in the downlink transmit timing obtained based on the parent node. It is assumed that an ideal downlink sending moment of the node 0 is TT0, and it is assumed that errors of TT1 and TT2 are E1 and E2. According to the foregoing Formula (2), the node 0 improves accuracy of the downlink transmit timing according to a weighted averaging method.

$$TT_{\{1,2\}} = w_1 \cdot TT_1 + w_2 \cdot TT_2 = TT_0 + w_1 \cdot E_1 + w_2 E_2 \quad \text{Formula (5)}$$

$TT_{\{1,2\}}$ is a first downlink transmit timing determined by the node 0, $w_1$ is a weight of the node 1, and $w_2$ is a weight of the node 2.

Proper weights are set for the node 1 and the node 2, so that precision of the downlink transmit timing of the node 0 can be improved.

Certainly, the node 0 may alternatively determine a value relationship between TT1 and TT2, and set the first downlink transmit timing to a value between TT1 and TT2.

In another possible implementation, a downlink receive timing at which the first node receives a downlink signal sent by a parent node k may be denoted as $RT_k$, and a downlink transmit timing obtained through calculation based on a parent node n may be denoted as $TT_n$. It should be noted that, $TT_n$ is only the downlink transmit timing (that is, the second downlink transmit timing described above) obtained through calculation by the first node based on timing information sent by the parent node, and there may be an error between an actual downlink sending moment of the first node and $TT_n$. When k=n, $RT_k - TT_n = TA/2 + T_{delta}$. Herein, the TA and $T_{delta}$ are both provided by the node k (also the node n). It should be noted that a downlink receiving time and a downlink sending time herein correspond to a same time unit, for example, a same radio frame.

When k is not equal to n, the first node may calculate $RT_k - TT_n$, to be specific, calculate a timing difference between the downlink receive timing of the node k and the downlink sending time that is determined by the node n. To implement weighted averaging on the timing difference, a downlink receive timing of a parent node may be fixed as a reference time.

In a possible implementation, in a handover scenario of a plurality of parent nodes, a node currently connected to the first node may be used as a reference timing node. In a multi-connectivity scenario, the first node may determine a reference downlink timing based on a protocol rule or configuration information, or the first node determines a reference node of a downlink receive timing.

In another possible implementation, the donor node indicates or configures, to or for the IAB node, a reference node that may be used to determine a downlink receive timing, that is, indicates, to the first node, the node k for determining the downlink receive timing $RT_k$. When the donor node does not configure the information, the IAB node uses a currently connected parent node as the reference node for determining the downlink receive timing.

To implement averaging for a plurality of parent nodes, the donor node may indicate the first node to report a time difference, and also indicate the parent node to report a partial time difference. For example, the parent node k may report a propagation delay Tp between the parent node k and the first node that is estimated by the parent node k, where Tp is equal to a time difference $RT_k - TT_k$. After receiving the reported information, the donor node may update a time difference. The time difference is obtained after the donor node performs averaging on timings of the plurality of parent nodes.

For example, when the first node has two parent nodes, the downlink transmit timing of the first node may be implemented in the following manner:

$$RT_1-TT_{\{1,2\}}=w_1(RT_1-TT_1)+w_2(RT_1-TT_2)=(w_1+w_2)$$
$$RT_1-w_1TT_1-w_2TT_2 \quad \text{Formula (6)}$$

$w_1+w_2=1$. It can be learned that Formula (6) is equivalent to Formula (2). To be specific, the first downlink transmit timing determined according to Formula (6) is the same as that determined according to Formula (2).

As described above, the first node may receive information such as the weight, the timing precision, or the weight intermediate value of each second node from the donor node; the first node determines the weight of the second node based on one or more of the foregoing information; and then the first node performs weighted averaging on the plurality of second downlink transmit timings based on the weights of the plurality of second nodes, to obtain a more accurate first downlink transmit timing. In an optional implementation, the donor node may alternatively perform this operation process. In this case, the donor node needs to obtain the plurality of second downlink transmit timings calculated by the first node. The first node sends the plurality of second downlink transmit timings to the donor node. The donor node receives the plurality of second downlink transmit timings from the first node, and performs weighted averaging on the plurality of second downlink transmit timings based on the weights of the plurality of second nodes, to obtain a more accurate first downlink transmit timing. In this implementation, the donor node does not need to send information such as the weight, the timing precision, or the weight intermediate value of each second node to the first node.

As described above, the donor node sends the first indication information to the first node, to indicate the information about the plurality of second nodes. The first node receives the timing information of the plurality of second nodes, and determines the first downlink transmit timing of the first node based on the timing information of the plurality of second nodes. In another possible implementation, the donor node may alternatively send indication information to the parent node of the first node, where the indication information is denoted as third indication information. The third indication information may be similar to the second indication information, and is used to indicate information about a plurality of second nodes. A second node determines, based on the third indication information, whether the second node belongs to the plurality of second nodes indicated by the third indication information; and if yes, the second node sends timing information to the first node; or if not, the second node does not send timing information to the first node. An occasion on which the donor node sends the third indication information to the parent node of the first node may be that when the first node accesses the second node, the donor node sends the third indication information to the second node.

Optionally, when a first node initially accesses a network, a parent node always sends timing information to the first node.

The donor node may alternatively send the first indication information to the first node and send the third indication information to the second node.

In a possible implementation, the downlink transmit timing of the first node is based on a specific reference signal or TRP (used to determine a receiving time RT).

When the first node obtains timing information from a parent node, a TA in the timing information should be obtained based on a specific beam pair. The beam pair herein includes QCL information of a physical channel/physical signal (for example, an SSB and a CSI-RS) of a parent node used by the first node to obtain a receive timing, and also includes spatial information or beam information for sending an uplink physical channel/reference signal (for example, a RACH and an SRS) by the first node.

In addition, one parent node may perform multi-TRP transmission for the first node. In this case, the downlink transmit timing of the first node may be based on timing information provided by one or more specific TRPs in a plurality of TRPs. The one or more specific TRPs herein may be configured by the parent node or the donor node, or may be selected by the first node.

In the foregoing embodiment, the first node determines the downlink transmit timing $TT_a$, or the first node obtains a timing difference $RT_n-TT_a$, and then deduces $TT_a$. The downlink transmit timing $TT_a$ and the timing difference $RT_n-TT_a$ are referred to as a nominal transmit timing and a nominal timing difference. The first node sets an actual downlink transmit timing or an actual downlink transmit timing difference based on the nominal timing or the nominal timing difference. The following uses the timing difference as an example for description.

In the following cases, the nominal timing difference of the first node is not equal to the actual timing difference of the first node:

Case 1: A timing wander occurs on the first node or the parent node, and the actual timing difference changes. The timing wander refers to a slow change in a signal sending time caused by a non-ideality of a clock of the first node or the parent node. A case of the timing wander may also include the following case: The first node sends a signal based on the determined first downlink transmit timing, and an actual sending moment at which the signal is sent is inconsistent with the first downlink transmit timing.

Case 2: The parent node retransmits timing information (T_delta or a TA) to the first node, and the nominal timing difference changes.

Case 3: The donor node retransmits first indication information to the first node, that is, reconfigures a list or a set of parent nodes, and the nominal timing difference changes.

When the nominal timing difference is not equal to the actual timing difference, the first node should adjust the actual timing difference, to make the actual timing difference equal to the nominal timing difference.

It should be understood that, in some cases, the nominal transmit timing or the nominal timing difference of the first node is within a range, and when the actual transmit timing or the actual transmit timing difference exceeds the range, the first node adjusts the actual timing difference.

It should be understood that, that the actual timing (or the timing difference) is equal to the nominal timing (or the timing difference) or is within a range of the nominal timing (or the timing difference) may include a specific error. For example, only when a difference between the actual timing (or the timing difference) and the nominal timing (or the timing difference) is greater than a specific error value (for example, 64Tc), the first node considers that the actual timing is not equal to the nominal timing, or only when the actual timing (or the timing difference) exceeds the range of the nominal timing (or the timing difference) by a specific error value (for example, 64Tc), the first node considers that the actual timing exceeds the range of the nominal timing. The error value may be defined in a protocol, or may be configured by the donor node or the parent node.

In this application, Tc is an example of a time unit. Tc is a basic time unit in NR. Tc=1/(480e3*4096) seconds.

However, it should be noted that adjustment of the actual timing difference by the first node is equivalent to adjustment of the downlink transmit timing by the first node. However, modulation of the downlink transmit timing may affect performance of a child node or an accessing terminal. Therefore, a speed at which the first node adjusts the actual timing or the actual timing difference should be defined in a protocol.

Specifically, a maximum adjustable time difference (for example, 128Tc) in a period of time (for example, 100 ms) may be defined, to prevent the speed at which the first node adjusts the timing from being excessively high. In addition, a minimum time difference (for example, 16Tc) that needs to be adjusted in a period of time (for example, 100 ms) may be additionally defined, to prevent the first node from being excessively slow in responding to a timing change.

It should be understood that, for a nominal downlink sending time, the first node may calculate different nominal time differences based on different parent nodes or different physical signals/channels of parent nodes. Therefore, to stabilize the downlink sending time, when behavior of changing a receive timing, such as a node handover or beam switching, occurs on the first node, the nominal timing difference needs to be recalculated based on a node that is handed over to or a beam that is switched to, to maintain the downlink timing.

In the foregoing embodiment, the IAB node obtains the plurality of pieces of timing information (TA/2+T_delta) from the plurality of parent nodes, to obtain the plurality of second downlink transmit timings $TT_n$, and then obtains the first downlink transmit timing based on the plurality of second downlink transmit timings $TT_n$.

In another possible implementation, the IAB node may alternatively obtain a plurality of pieces of timing information (TA(m)/2+T_delta(m)) from a same parent node to obtain a plurality of pieces of third timing information TT(m), and then obtain a first downlink transmit timing based on a plurality of third downlink transmit timings TT(m). The plurality of pieces of timing information (TA(m)/2+T_delta(m)) indicate timing information provided by the same parent node for the IAB node in different conditions. For example, the different conditions include any one or more of the following: different moments, different beams, different transmission configuration indication states TCI states, different quasi co-location QCL information, different reference signals or physical signals, and different TRPs. In the different conditions, T_delta(m) may have different values, or may have a same value.

For example, the parent node may send M parameters T_delta(m) at M moments, which are respectively denoted as T_delta(0), . . . , and T_delta(M−1), and the IAB node obtains M pieces of corresponding downlink timing information (TA(m)/2+T_delta(m)), where TA(m) indicates a TA value maintained by the IAB node when T_delta(m) is received.

In another example, the parent node sends a T_delta' value, and indicates, by using additional signaling, TA values TA(m) at M moments; and then the IAB node obtains M pieces of downlink timing information (TA(m)/2+T_delta (m)). T_delta(m)=T_delta'.

Further, the parent node may add or delete a plurality of pieces of downlink timing information (TA(m)/2+T_delta (m)) maintained by the IAB node. The downlink timing information (TA(m)/2+T_delta(m)) may be added by additionally configuring a value of T_delta(m) or a value of TA(m). The downlink timing information (TA(m)/2+T_delta (m)) may be deleted by releasing a configured value of T_delta(m) or a configured value of TA(m).

Optionally, the M moments may also be replaced with M time intervals, or other conditions mentioned in the foregoing different conditions, for example, different beams or different TCI states.

After obtaining the plurality of pieces of timing information (TA(m)/2+T_delta(m)), the IAB node may obtain the plurality of third downlink timings by using a method the same as that for obtaining the plurality of second downlink timings in the foregoing embodiment. Alternatively, the IAB node may obtain a plurality of timing time differences by using a method the same as that in the foregoing embodiment. Then, the IAB node may obtain the nominal downlink transmit timing or the nominal timing difference by using a method such as weighted averaging.

In the foregoing embodiments provided in this application, the method provided in the embodiments of this application is described separately from perspectives of the first node, the donor node, and interaction between the first node and the donor node. To implement functions in the method provided in the embodiments of this application, the first node and the donor node each may include a hardware structure and/or a software module, and implement the functions in a form of the hardware structure, the software module, or a combination of the hardware structure and the software module. Whether a specific function in the foregoing functions is performed by the hardware structure, the software module, or the combination of the hardware structure and the software module depends on a specific application and a design constraint of the technical solutions.

Figure 7:
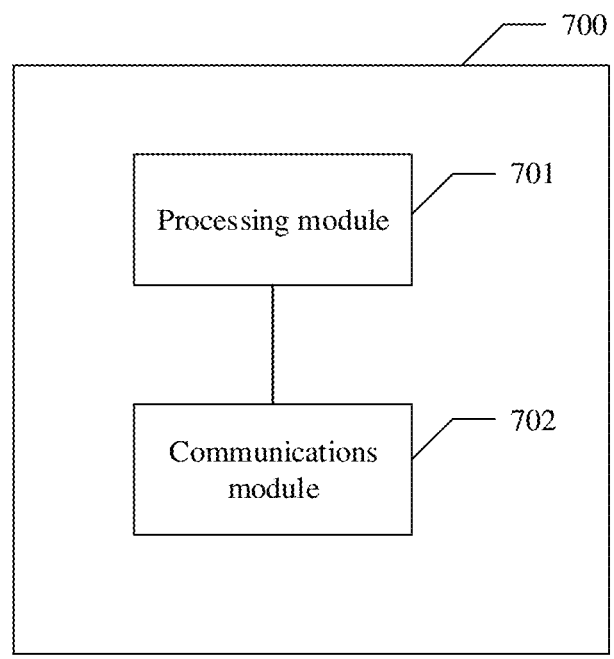
FIG. 7 is a first schematic structural diagram of a timing synchronization apparatus according to an embodiment of this application.

As shown in FIG. 7, based on a same technical concept, an embodiment of this application further provides an apparatus 700. The apparatus 700 may be a first node or a donor node; or may be an apparatus in a first node or a donor node; or may be an apparatus that can match and be used with a first node or a donor node. In a design, the apparatus 700 may include modules that are in a one-to-one correspondence with the method/operations/steps/actions performed by the first node or the donor node in the foregoing method embodiments. The modules may be implemented by a hardware circuit, software, or a combination of a hardware circuit and software. In a design, the apparatus may include a processing module 701 and a communications module 702.

When the apparatus 700 is configured to perform the method performed by the first node, the communications module 702 is configured to receive first indication information from the donor node, where the first indication information is used to indicate information about a plurality of second nodes, and the second node is a parent node of the first node; and configured to receive a plurality of pieces of timing information from the plurality of second nodes; and the processing module 701 is configured to determine a first downlink transmit timing of the first node based on the plurality of pieces of timing information.

The processing module 701 and the communications module 702 may be further configured to perform another corresponding step or operation performed by the terminal device in the foregoing method embodiments. Details are not described herein again.

When the apparatus 700 is configured to perform the method performed by the donor node, the processing module 701 is configured to obtain information about a plurality of second nodes; and the communications module 702 is configured to send first indication information to the first node, where the first indication information is used to indicate the information about the plurality of second nodes, and the second node is a parent node of the first node.

The processing module 701 and the communications module 702 may be further configured to perform another corresponding step or operation performed by the network device in the foregoing method embodiments. Details are not described herein again.

Division into modules in this embodiment of this application is an example, is merely logical function division, and may be other division during actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 8:
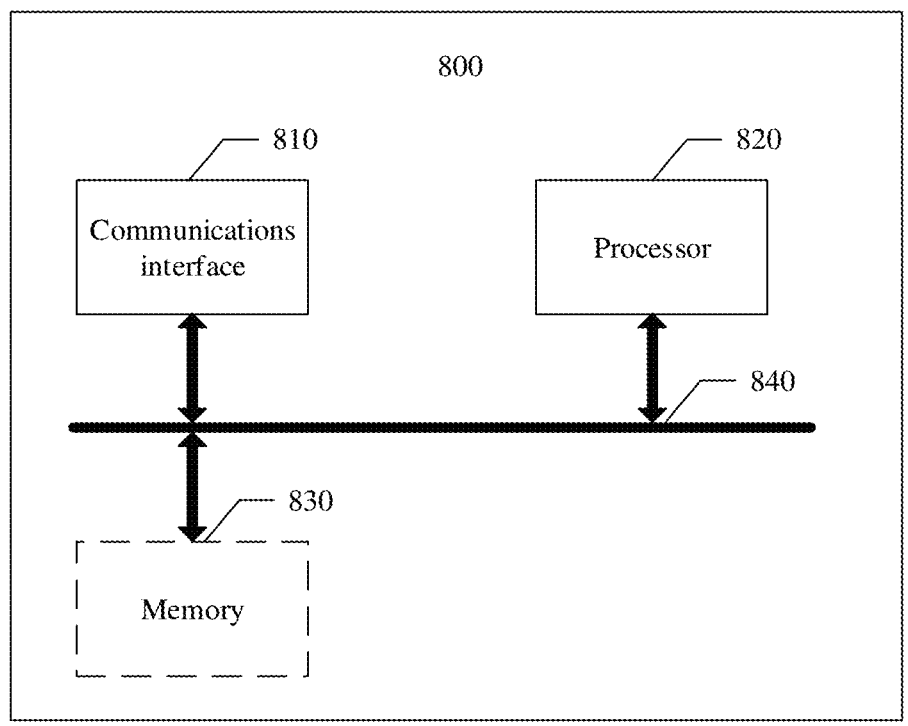
FIG. 8 is a second schematic structural diagram of a timing synchronization apparatus according to an embodiment of this application.

FIG. 8 shows an apparatus 800 according to an embodiment of this application. The apparatus 800 is configured to implement the function of the first node or the donor node in the foregoing method. When the function of the donor node is implemented, the apparatus may be the donor node; or may be an apparatus in the donor node; or may be an apparatus that can match and be used with the donor node. When the function of the first node is implemented, the apparatus may be the first node; or may be an apparatus in the first node; or may be an apparatus that can match and be used with the first node. The apparatus may be a chip system. In this embodiment of this application, the chip system may include a chip, or may include a chip and another discrete component. The apparatus 800 includes at least one processor 820, configured to implement the function of the first node or the donor node in the method provided in the embodiments of this application. The apparatus 800 may further include a communications interface 810. In this embodiment of this application, the communications interface may be a transceiver, a circuit, a bus, a module, or a communications interface of another type, and is configured to communicate with another device through a transmission medium. For example, the communications interface Bio is used by an apparatus in the apparatus 800 to communicate with the another device. For example, when the apparatus 800 is the donor node, the another device may be the first node. When the apparatus 800 is the first node, the another apparatus may be the donor node. The processor 820 receives and sends data through the communications interface 810, and is configured to implement the method in the foregoing method embodiments. For example, when the function of the donor node is implemented, the processor 820 is configured to obtain information about a plurality of second nodes. The communications interface Bio is configured to send first indication information to the first node, where the first indication information is used to indicate the information about the plurality of second nodes, and the second node is a parent node of the first node. When the function of the first node is implemented, the communications interface Bio is configured to receive first indication information from the donor node, where the first indication information is used to indicate information about a plurality of second nodes, and the second node is a parent node of the first node; and configured to receive a plurality of pieces of timing information from the plurality of second nodes. The processor 820 is configured to determine a first downlink transmit timing of the first node based on the plurality of pieces of timing information. For details, refer to the detailed descriptions in the method examples, and details are not described herein again.

The apparatus 800 may further include at least one memory 830, configured to store a program instruction and/or data. The memory 830 is coupled to the processor 820. The coupling in this embodiment of this application may be indirect coupling or a communication connection between apparatuses, units, or modules in an electrical form, a mechanical form, or another form, and is used for information exchange between the apparatuses, the units, or the modules. The processor 820 may operate in collaboration with the memory 830. The processor 820 may execute the program instruction stored in the memory 830. At least one of the at least one memory may be included in the processor.

In this embodiment of this application, a specific connection medium between the communications interface 810, the processor 820, and the memory 830 is not limited. In this embodiment of this application, the memory 830, the processor 820, and the communications interface 810 are connected by using a bus 840 in FIG. 8, where the bus is represented by a thick line in FIG. 8. A connection manner between other components is schematically described, and is not limited herein. The bus may be classified into an address bus, a data bus, a control bus, and the like. For ease of representation, only one thick line is used to represent the bus in FIG. 8, but this does not mean that there is only one bus or only one type of bus.

In this embodiment of this application, the processor may be a general-purpose processor, a digital signal processor, an application-specific integrated circuit, a field programmable gate array or another programmable logic device, a discrete gate or a transistor logic device, or a discrete hardware component, and may implement or perform the methods, the steps, and logical block diagrams disclosed in the embodiments of this application. The general-purpose processor may be a microprocessor, any conventional processor, or the like. The steps of the method disclosed with reference to the embodiments of this application may be directly performed and completed by a hardware processor, or may be performed and completed by a combination of hardware and a software module in the processor.

In this embodiment of this application, the memory may be a non-volatile memory, for example, a hard disk (hard disk drive, HDD) or a solid-state drive (SSD), or may be a volatile memory, for example, a random access memory (random-access memory, RAM). The memory is any other medium that can be used to carry or store expected program code in a form of an instruction or a data structure and that can be accessed by a computer, but is not limited thereto. The memory in this embodiment of this application may alternatively be a circuit or any other apparatus that can implement a storage function, and is configured to store a program instruction and/or data.

When the apparatus 700 and the apparatus 800 are specifically chips or chip systems, the communications module 702 and the communications interface 810 may output or receive a baseband signal. When the apparatus 700 and the apparatus 800 are specifically devices, the communications module 702 and the communications interface 810 may output or receive a radio frequency signal.

An embodiment of this application provides a computer storage medium. The computer storage medium stores a computer program, and the computer program includes an instruction used to perform the timing synchronization method provided in the foregoing embodiments.

An embodiment of this application further provides a computer program product including an instruction. When the computer program product runs on a computer, the computer is enabled to perform the timing synchronization method provided in the foregoing embodiments.

An embodiment of this application further provides a chip. The chip includes a processor and an interface circuit. The interface circuit is coupled to the processor. The processor is configured to run a computer program or an instruction, to implement the foregoing timing synchronization method. The interface circuit is configured to communicate with another module outside the chip.

All or some of the methods provided in the embodiments of this application may be implemented by using software, hardware, firmware, or any combination thereof. When software is used for implementation, all or some of the methods may be implemented in a form of a computer program product. The computer program product includes one or more computer instructions. When the computer program instructions are loaded and executed on a computer, all or some of the procedures or the functions according to the embodiments of the present invention are generated. The computer may be a general-purpose computer, a dedicated computer, a computer network, a network device, user equipment, or another programmable apparatus. The computer instructions may be stored in a computer-readable storage medium, or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

In the embodiments of this application, on a premise that there is no logical contradiction, the embodiments may be mutually referenced. For example, methods and/or terms in the method embodiments may be mutually referenced, functions and/or terms in the apparatus embodiments may be mutually referenced, and functions and/or terms in the apparatus embodiments and the method embodiments may be mutually referenced.

It is clear that a person skilled in the art can make various modifications and variations to the embodiments of this application without departing from the spirit and scope of the embodiments of this application. In this way, this application is intended to cover these modifications and variations made to the embodiments of this application, provided that they fall within the scope of the claims of this application and their equivalent technologies.

What is claimed is:

1. A method, comprising:
    determining a sending moment of a distributed unit (DU) of a first node for sending data in a downlink transmit frame of the DU, the sending moment for the downlink transmit frame being earlier than a receiving moment of a downlink receive frame of a mobile terminal (MT) of the first node by an advanced time, the downlink receive frame configured for receiving data from a parent node of the first node, and the advanced time satisfying:

$(N_{TA}+N_{TA,offset}) \cdot T_c/2 + T\_delta$, wherein $N_{TA}$ is an index indicating a timing advance (TA) of the first node for uplink transmission, $N_{TA,offset}$ is a timing advance offset of a serving cell, $T_c=1/(\Delta f_{max} \cdot N_f)$, $\Delta f_{max}=480 \cdot 10^3$, and $N_f=4096$, and T_delta is a timing adjustment amount received from the parent node by the first node to compensate for a difference between TA/2, which is determined from $N_{TA}$ received from the parent node by the first node, and a transmission time Tp between the first node and the parent node; and
    sending data by the DU of the first node according to the sending moment,
    wherein T_delta satisfies:

$(-N_{TA,offset}/2 + N_{T\_delta,min} + N_{T\_delta} \cdot G_{T\_delta})T_c$, wherein $n_{T\_delta}$ is configured by the parent node of the first node, and $N_{T\_delta,min}$ and $G_{T\_delta}$ are values that are configured by the parent node, or are determined by using a protocol text.

2. The method according to claim 1, wherein when an operating frequency band of the first node is frequency range 1 defined in the 3GPP standard technical specification, a value of $N_{T\_delta,min}$ is −70528, −35328, or −17664.

3. The method according to claim 1, wherein when an operating frequency band of the first node is frequency range 2 defined in the 3GPP standard technical specification, a value of $N_{T\_delta,min}$ is −17664, or −8816.

4. The method according to claim 1, wherein when an operating frequency band of the first node is frequency range 1 defined in the 3GPP standard technical specification, $G_{T_{delta}}$ is 64.

5. The method according to claim 1, wherein when an operating frequency band of the first node is frequency range 2 defined in the 3GPP standard technical specification, $G_{T_{delta}}$ is 32.

6. The method according to claim 1, wherein $n_{T_{delta}}$ is indicated to the first node using multimedia access control-control element (MAC-CE) signaling.

7. The method according to claim 1, wherein $n_{T_{delta}}$ is indicated to the first node using 11-bit signaling.

8. A first node, comprising:
    a transceiver;
    at least one processor; and
    a non-transitory computer-readable storage medium storing a program to be executed by the at least one processor, the program including instructions to:
    determine a sending moment of a distributed unit (DU) of the first node for sending data in a downlink transmit frame of the DU, the sending moment for the downlink transmit frame being earlier than a receiving moment of a downlink receive frame of a mobile terminal (MT) of the first node by an advanced time, the downlink receive frame configured for receiving data from a parent node of the first node, and the advanced time satisfying:

$(N_{TA}+N_{TA,offset}) \cdot T_c/2 + T\_delta$, wherein $N_{TA}$ is an index indicating a timing advance (TA) of the first node for uplink transmission, $N_{TA,offset}$ is a timing advance offset of a serving cell, $T_c=1/(\Delta f_{max} \cdot N_f)$, $\Delta f_{max}=480 \cdot 10^3$, and $N_f=4096$, and T_delta is a timing adjustment amount received from the parent node by the first node to compensate for a difference between TA/2, which is determined from $N_{TA}$ received from the parent node by the first node, and a transmission time Tp between the first node and the parent node; and send data according to the sending moment,
wherein T_delta satisfies:

$$(-N_{TA,offset}/2+N_{T\_delta,min}+N_{T\_delta}\cdot G_{T\_delta})T_c,$$

wherein $N_{T\_delta}$ is configured by the parent node of the first node, and $N_{T\_delta,min}$ and $G_{T\_delta}$ are values that are configured by the parent node, or are determined by using a protocol text.

9. The first node according to claim 8, wherein when an operating frequency band of the first node is frequency range 1 defined in the 3GPP standard technical specification, a value of $N_{T\_delta,min}$ is −70528, −35328, or −17664.

10. The first node according to claim 8, wherein when an operating frequency band of the first node is frequency range 2 defined in the 3GPP standard technical specification, a value of $N_{T\_delta,min}$ is −17664, or −8816.

11. The first node according to claim 8, wherein when an operating frequency band of the first node is frequency range 1 defined in the 3GPP standard technical specification, $G_{T_{delta}}$ is 64.

12. The first node according to claim 8, wherein when an operating frequency band of the first node is frequency range 2 defined in the 3GPP standard technical specification, $G_{T_{delta}}$ is 32.

13. The first node according to claim 8, wherein $n_{T_{delta}}$ is indicated to the first node using multimedia access control-control element (MAC-CE) signaling.

14. The first node according to claim 8, wherein $n_{T_{delta}}$ is indicated to the first node using 11-bit signaling.

15. A non-transitory computer storage medium, storing computer instructions that, when executed by a network device, cause the network device to perform:
   determining a sending moment of a distributed unit (DU) of a first node for sending data in a downlink transmit frame of the DU, the sending moment for the downlink transmit frame being earlier than a receiving moment of a downlink receive frame of a mobile terminal (MT) of the first node by an advanced time, the downlink receive frame configured for receiving data from a parent node of the first node, and the advanced time satisfying:

$$(N_{TA}+N_{TA,offset})\cdot T_c/2+T\_delta,$$

wherein $N_{TA}$ is an index indicating a timing advance (TA) of the first node for uplink transmission, $N_{TA,offset}$ is a timing advance offset of a serving cell, $T_c=1/(\Delta f_{max}\cdot N_f)$, $\Delta f_{max}=480\cdot 10^3$, and $N_f=4096$, and T_delta is a timing adjustment amount received from the parent node by the first node to compensate for a difference between TA/2, which is determined from $N_{TA}$ received from the parent node by the first node, and a transmission time Tp between the first node and the parent node; and
   sending data by the first node according to the sending moment,
   wherein T_delta satisfies:

$$(-N_{TA,offset}/2+N_{T\_delta,min}+n_{T\_delta}\cdot G_{T\_delta})T_c,$$

wherein $n_{T\_delta}$ is configured by the parent node of the first node, and $N_{T\_delta,min}$ and $G_{T\_delta}$ are values that are configured by the parent node, or are determined by using a protocol text.

16. The non-transitory computer storage medium according to claim 15, wherein when an operating frequency band of the first node is frequency range (FR) 1 defined in the 3GPP standard technical specification, a value of $N_{T\_delta,min}$ is −70528, −35328, or −17664, and $G_{T\_delta}$ is 64; and
   wherein when an operating frequency band of the first node is FR 2 defined in the 3GPP standard technical specification, a value of $N_{T\_delta,min}$ is −17664, or −8816, and $G_{T\_delta}$ is 32.

17. The non-transitory computer storage medium according to claim 15, wherein $n_{T\_delta}$ is indicated using multimedia access control-control element (MAC-CE) signaling.

18. The non-transitory computer storage medium according to claim 15, wherein when an operating frequency band of the first node is frequency range 1 defined in the 3GPP standard technical specification, $G_{T\_delta}$ is 64.

19. The non-transitory computer storage medium according to claim 15, wherein when an operating frequency band of the first node is frequency range 2 defined in the 3GPP standard technical specification, $G_{T\_delta}$ is 32.

20. The non-transitory computer storage medium according to claim 15, wherein $N_{T_{delta}}$ is indicated to the first node using 11-bit signaling.

* * * * *

UNITED STATES PATENT AND TRADEMARK OFFICE
CERTIFICATE OF CORRECTION

PATENT NO. : 12,445,989 B2  
APPLICATION NO. : 17/672516  
DATED : October 14, 2025  
INVENTOR(S) : Liu et al.

Page 1 of 1

It is certified that error appears in the above-identified patent and that said Letters Patent is hereby corrected as shown below:

In the Claims

In Column 32, in Claim 1, Line 15, delete "$N_{T\_delta} \cdot G_{T\_delta})T_c$," and insert -- $n_{T\_delta} \cdot G_{T\_delta})T_c$, --.

In Column 33, in Claim 8, Line 4, delete "$N_{T\_delta} \cdot G_{T\_delta})T_c$," and insert -- $n_{T\_delta} \cdot G_{T\_delta})T_c$, --.

In Column 33, in Claim 8, Line 5, delete "$N_{T\_delta}$" and insert -- $n_{T\_delta}$ --.

In Column 34, in Claim 20, Line 41, delete "$N_{Tdelta}$" and insert -- $n_{Tdelta}$ --.

Signed and Sealed this  
Second Day of December, 2025

John A. Squires  
*Director of the United States Patent and Trademark Office*